United States Patent
Cao et al.

(10) Patent No.: US 11,189,023 B2
(45) Date of Patent: Nov. 30, 2021

(54) DEVICES, SYSTEMS, AND METHODS FOR ANCHOR-POINT-ENABLED MULTI-SCALE SUBFIELD ALIGNMENT

(71) Applicant: Canon Virginia, Inc., Newport News, VA (US)

(72) Inventors: Xiwu Cao, Arcadia, CA (US); Nikhil Krishnan, Lake Forest, CA (US); Bradley Scott Denney, Irvine, CA (US); Hung Khei Huang, Irvine, CA (US)

(73) Assignee: Canon Virginia, Inc., Newport News, VA (US)

( * ) Notice: Subject to any disclaimer, the term of this patent is extended or adjusted under 35 U.S.C. 154(b) by 0 days.

(21) Appl. No.: 16/952,869

(22) Filed: Nov. 19, 2020

(65) Prior Publication Data
US 2021/0073965 A1   Mar. 11, 2021

Related U.S. Application Data

(62) Division of application No. 16/248,480, filed on Jan. 15, 2019, now Pat. No. 10,997,712.

(60) Provisional application No. 62/758,275, filed on Nov. 9, 2018, provisional application No. 62/618,840, filed on Jan. 18, 2018.

(51) Int. Cl.
  *G06T 7/00*  (2017.01)
  *G06T 3/00*  (2006.01)
  *G06T 7/32*  (2017.01)
  *G06T 7/33*  (2017.01)

(52) U.S. Cl.
  CPC ............ *G06T 7/001* (2013.01); *G06T 3/0068* (2013.01); *G06T 3/0093* (2013.01); *G06T 7/32* (2017.01); *G06T 7/337* (2017.01); *G06T 2207/10116* (2013.01); *G06T 2207/20021* (2013.01)

(58) Field of Classification Search
  CPC ....... G06T 7/001; G06T 7/337; G06T 7/0002; G06T 7/0004; G06T 7/0008; G06T 7/0014; G03F 1/84; G03F 7/7065; G03F 1/44
  See application file for complete search history.

(56) References Cited

U.S. PATENT DOCUMENTS

| | | | | |
|---|---|---|---|---|
| 5,943,551 A | * | 8/1999 | Schemmel | G01R 31/318505 438/14 |
| 6,356,300 B1 | * | 3/2002 | Shiba | G03F 7/70633 348/130 |
| 6,539,106 B1 | * | 3/2003 | Gallarda | G06K 9/6202 382/149 |
| 2003/0174877 A1 | * | 9/2003 | Aiger | G01R 31/2801 382/145 |

(Continued)

*Primary Examiner* — Dung Hong
(74) *Attorney, Agent, or Firm* — Canon U.S.A., Inc. IP Division

(57) ABSTRACT

Devices, systems, and methods obtain a reference image; obtain a test image; globally align the test image to the reference image; select subfields in the test image; align the subfields in the test image with respective areas in the reference image; warp the test image based on the aligning of the subfields; select anchor points in the reference image; select anchor-edge points in the reference image; realign the subfields in the warped test image with respective areas in the reference image based on the anchor points in the reference image and on the anchor-edge points in the reference image; and warp the warped test image based on the realigning of the subfields.

15 Claims, 28 Drawing Sheets

(56) References Cited

U.S. PATENT DOCUMENTS

| | | | |
|---|---|---|---|
| 2013/0114102 A1* | 5/2013 | Yamamoto | H04N 1/193 358/1.14 |
| 2014/0151551 A1* | 6/2014 | Xiao | G03F 7/70625 250/307 |
| 2014/0268207 A1* | 9/2014 | Fukase | G03G 15/5062 358/1.14 |
| 2015/0170360 A1* | 6/2015 | Fletcher | G06T 7/32 382/128 |
| 2019/0066286 A1* | 2/2019 | Shiratsuchi | G06T 5/002 |
| 2019/0122913 A1* | 4/2019 | Lauber | G06T 7/001 |
| 2019/0214221 A1* | 7/2019 | Ishii | H01J 37/147 |
| 2020/0311894 A1* | 10/2020 | Takahashi | G01N 21/88 |

* cited by examiner differences between newIM and refIM (A) interpolated shifts, in pixels difference between processedIM and refIM (B) before MSS alignment      (C) after MSS alignment (A) anchor points and anchor-edge points   (B) neighborhoods of anchor-edge points differences between processedIm and refIm
(A) from MSS alignment    (B) from APMSS alignment Window size : 9 x 9

Window size : 17 x 17

Window size : 33 x 33

Window size : 65 x 65

Reference-image subfield

Input-image subfield

Reference-image subfield

Input-image subfield

Reference-image subfield

Input-image subfield

DEVICES, SYSTEMS, AND METHODS FOR ANCHOR-POINT-ENABLED MULTI-SCALE SUBFIELD ALIGNMENT

CROSS-REFERENCE TO RELATED APPLICATIONS

This application is a divisional of U.S. application Ser. No. 16/248,480, which was filed on Jan. 15, 2019 and which claims the benefit of U.S. Application No. 62/618,840, which was filed on Jan. 18, 2018, and the benefit of U.S. Application No. 62/758,275, which was filed on Nov. 9, 2018.

BACKGROUND

Technical Field

This application generally concerns image alignment.

Background

Some computer-vision systems align two images. For example, some nondestructive testing systems, which examine the properties of objects without causing damage to the objects, align images of objects before searching for object defects in one or more of the images. These techniques can be used in a quality-control process to identify defects in objects.

SUMMARY

Some embodiments obtain a test image; globally align the test image to the reference image; select subfields in the test image; align the subfields in the test image with respective areas in the reference image; warp the test image based on the aligning of the subfields; select anchor points in the reference image; select anchor-edge points in the reference image; realign the subfields in the warped test image with respective areas in the reference image based on the anchor points in the reference image, the anchor-edge points in the reference image, and warp the warped test image based on the realigning of the subfields.

DESCRIPTION

The following paragraphs describe certain explanatory embodiments. Other embodiments may include alternatives, equivalents, and modifications. Additionally, the explanatory embodiments may include several novel features, and a particular feature may not be essential to some embodiments of the devices, systems, and methods that are described herein.

Figure 1:
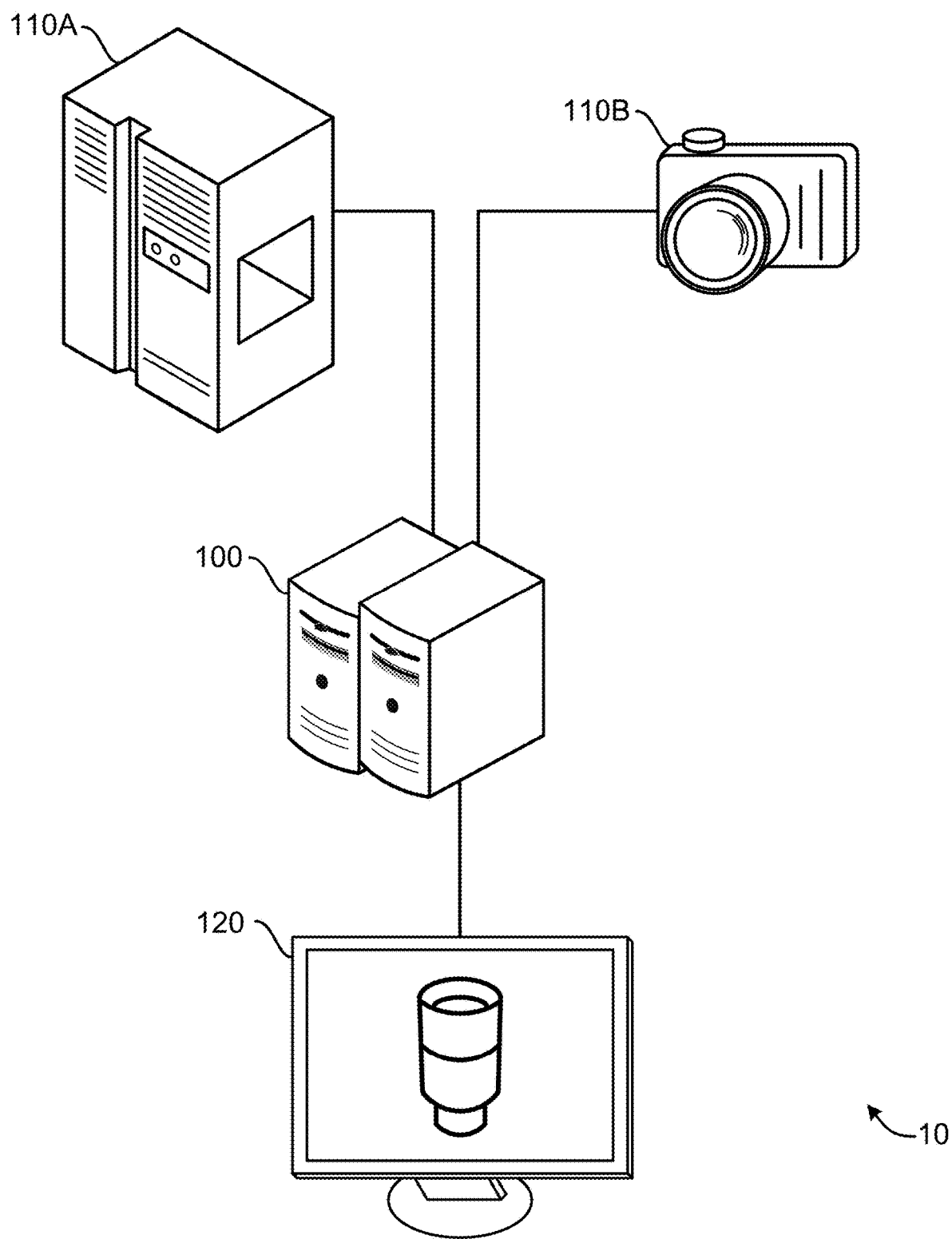
FIG. 1 illustrates an example embodiment of an image-alignment system.

FIG. 1 illustrates an example embodiment of an image-alignment system. The system 10 includes one or more image-alignment devices 100, which are specially-configured computing devices; one or more image-capturing devices, such as an x-ray detector 110A or a camera 110B; and at least one display device 120.

The one or more image-alignment devices 100 are configured to obtain one or more images of an object from one or both of the image-capturing devices. The one or more image-alignment devices 100 are also configured to align the one or more images of the object with a reference image, which may be an image of a defect-free object.

A high-precision alignment allows a good comparison of a reference image with another image of an object (e.g., an image of an object that is being tested). To allow a pixel-to-pixel comparison of the images, the one or more image-alignment devices 100 may align the other image with the reference image at a pixel level or a sub-pixel level.

Also, in some circumstances a general rigid alignment will not work. For example, when an X-ray image is a two-dimensional image of a three-dimensional object, the two-dimensional image shows a flattened image of the object's three-dimensional shape or structure (e.g., a two-dimensional projection of the three-dimensional object). Any variation in depth, rotation, or orientation in the three-dimensional positions may make a rigid alignment incapable of handling the distortion caused by these three-dimensional variations. Also, a general non-rigid alignment may cause problems, for example when a goal of the alignment is to make the geometry of the three-dimensional object consistent in all the images, because the geometry could be altered by a general non-rigid alignment.

Thus, some embodiments of the one or more image-alignment devices 100 perform an alignment that combines intensity-based alignment, feature-based alignment, rigid alignment, and non-rigid alignment.

Figure 2:
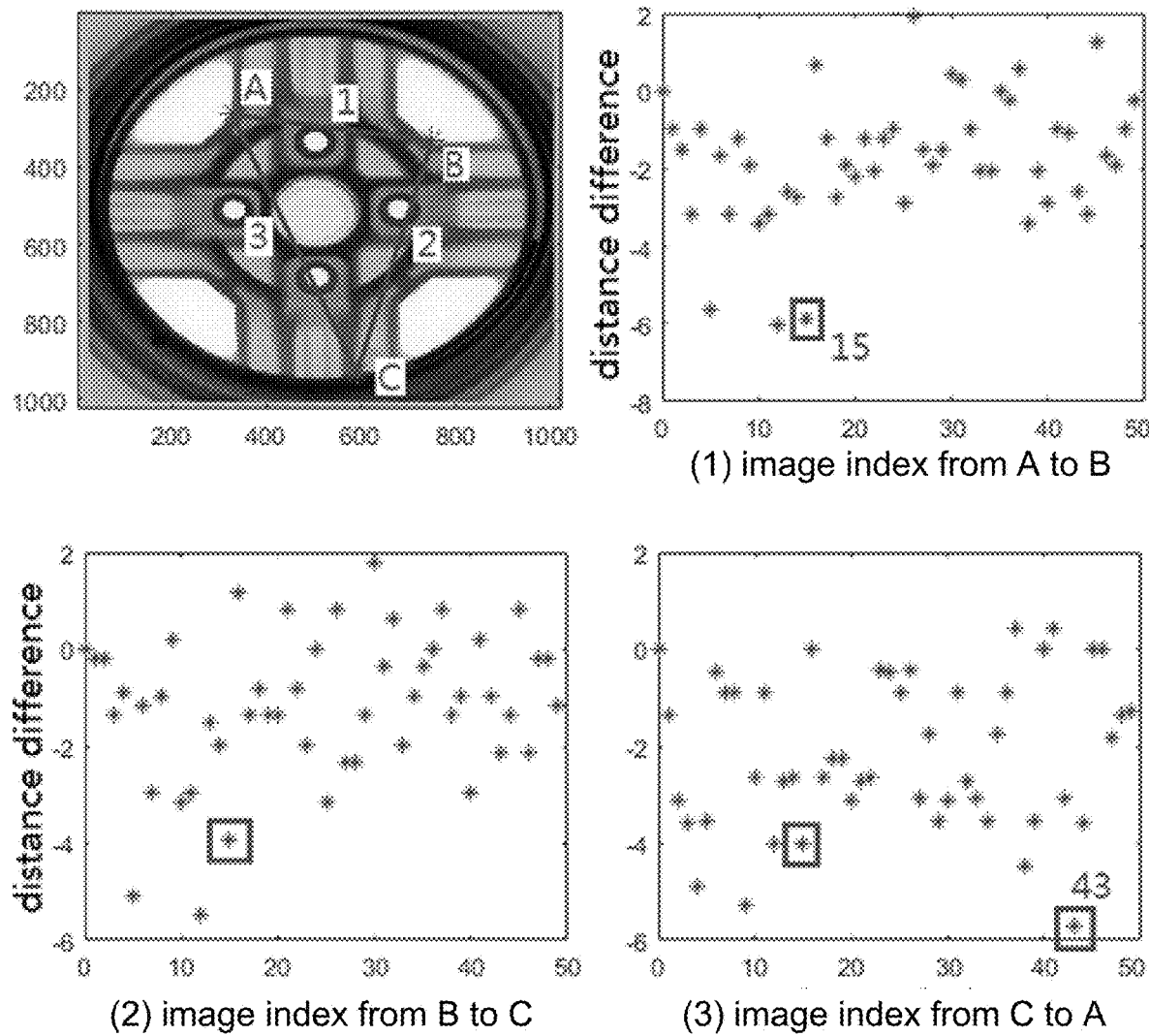
FIG. 2 illustrates an example embodiment of a rigid alignment that shows some limitations of rigid alignments.

FIG. 2 illustrates an example embodiment of a rigid alignment that shows some limitations of rigid alignments. A rigid alignment that is based on the shifts on the x and y axes, on the rotation angle, or on the parameters of a Nomography transformation is generally adequate to generate a rough alignment between two images. However, a rigid alignment may not be adequate in situations that require a sub-pixel-level alignment. This inadequacy can be illustrated using the variations of the distances between three selected positions in each image across a total of fifty images, which were taken from different machined parts that were built using the same CAD model, as shown in FIG. 2.

The top-left of FIG. 2 shows three positions: A, B, and C. The positions A, B, and C were selected in each of the fifty images, and the positions are landmarks that can be used to align the images. The distances between the three pairs of positions (i.e., the distances between A and B, B and C, and C and A) were measured. The three distance measurements from the image at index 0 are used as the point of reference (distance 0) in this example. The distance differences of all other images against the image at index 0 are shown in the three other sub-figures. The top-right shows the differences of the distances from A to B, the bottom-left shows the differences of the distances from B to C, and the bottom-right shows the differences of the distances from C to A.

If the transformation for aligning different images can use a parametric approach (e.g., a rigid alignment), significant variations between the measurements of the three distances across different images should not be present. However, significant variations are present. For example, compared to the other images, image 15 has significant differences from image 0 in all three measurements (A to B, B to C, and C to A), but image 43 shows a significant difference for only one measurement (C to A).

Moreover, a general non-rigid alignment could produce unwanted results. For example, although a non-rigid alignment might produce only a small computational error, it may distort the structural information.

Accordingly, some embodiments of the one or more image-alignment devices 100 perform the following operations: They split the image into multiple subfields (e.g., patches, areas). Then they align each subfield of one image to the corresponding subfield in one or more other images, and they generate shifts in the x and y directions for each subfield based on the alignment. The shifts may be interpolated and converted into respective shifts of each pixel. Finally, they warp the image based on the pixel shifts in the x and y directions to generate an aligned image.

Also, some embodiments of the one or more image-alignment devices perform a global alignment on an image to get a rough global shift for the whole image in the x and y directions. Then these embodiments perform a multi-scale subfield (MSS) alignment to get a sub-pixel-level alignment for each subfield. After that, these embodiments perform an anchor-point multi-scale-subfield alignment (APMSS) and use its results to finely adjust (e.g., shift, warp) the image to produce an aligned image with structure information that is undistorted.

Figure 3:
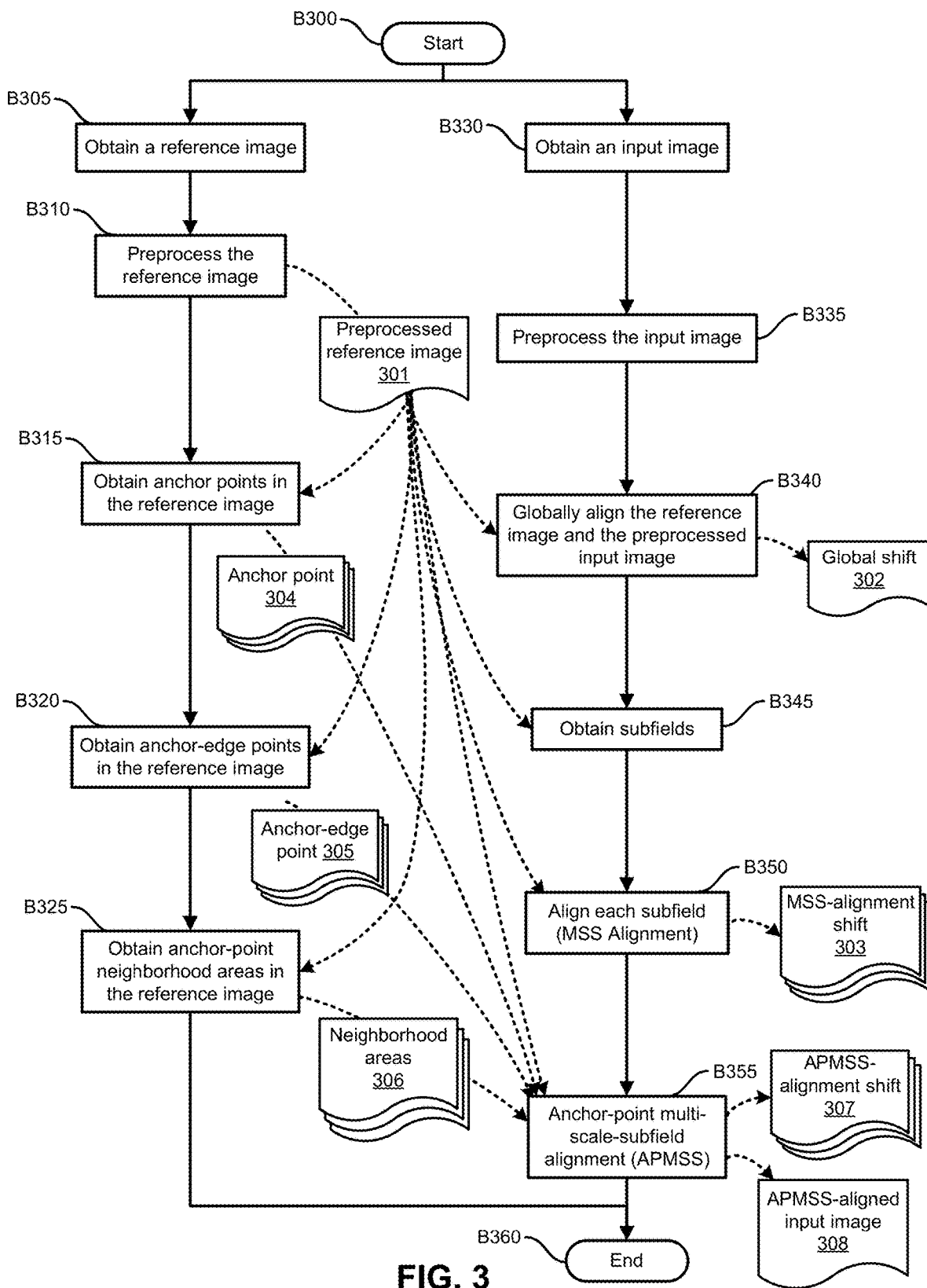
FIG. 3 illustrates an example embodiment of an operational flow for aligning images.

FIG. 3 illustrates an example embodiment of an operational flow for aligning images. Although this operational flow is presented in a certain order, some embodiments may perform at least some of the operations in different orders than the presented order. Examples of different orders include concurrent, parallel, overlapping, reordered, simultaneous, incremental, and interleaved orders. Thus, other embodiments of the operational flow may omit blocks, add blocks, change the order of the blocks, combine blocks, or divide blocks into more blocks.

Furthermore, although the embodiments of this operational flow and the other operational flows that are described herein are performed by an image-alignment device, some embodiments of these operational flows are performed by two or more image-alignment devices or by one or more other specially-configured computing devices.

Figure 4:
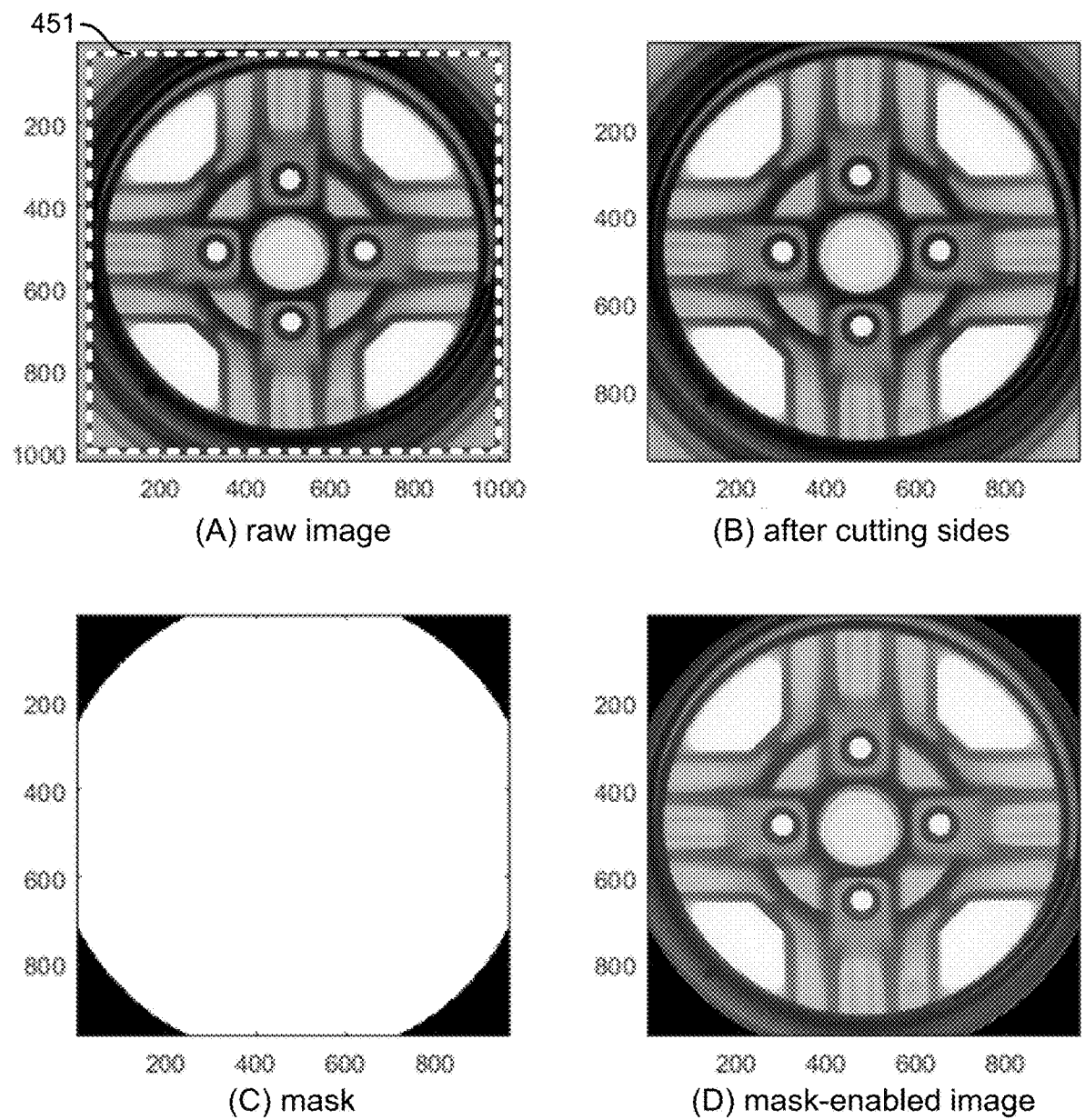
FIG. 4 illustrates an example embodiment of image preprocessing.

The operational flow in FIG. 3 starts in block B300 and then splits into a first flow and a second flow. The first flow proceeds to block B305, where the image-alignment device obtains a reference image (e.g., an image of a defect-free object). Next, in block B310, the image-alignment device preprocesses the image, thereby generating a preprocessed reference image 301. The preprocessing may include two operations. The first operation removes (e.g., cuts out) invalid, unwanted, or irrelevant areas from the reference image. For example, the preprocessing may remove the areas of the image in (A) in FIG. 4 that are outside the bounding box 451. In FIG. 4, (B) shows the image after the areas that are outside the bounding box 451 have been removed. The second operation generates a mask for the image. For example, the mask may be generated based on an intensity threshold or on information about the spatial structure of the object in the image. In FIG. 4, (C) shows an example of a mask, and (D) shows the image after the mask has been applied. In some embodiments, the reference image may be filtered (e.g., a filter that sharpens edges).

After block B310, the first flow moves to block B315, which will be described below.

From block B300, the second flow moves to block B330. In block B330, the image-alignment device obtains an input image (e.g., a test image, which is an image of an object that is being examined). Next, in block B335, the image-alignment device preprocesses the input image. Then the second flow moves to block B340.

Figure 5:
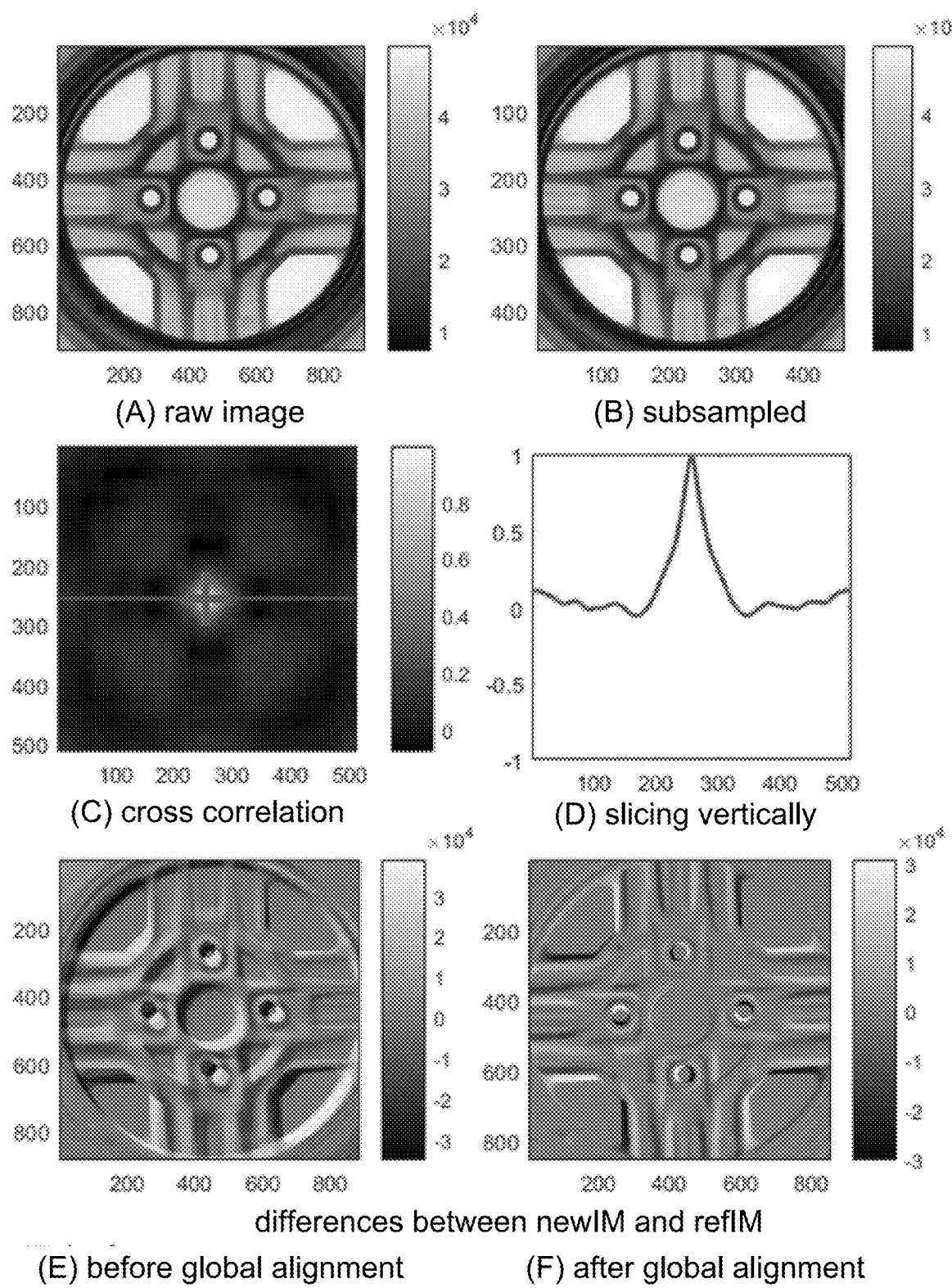
FIG. 5 illustrates an example embodiment of global alignment.

In block B340, the image-alignment device globally aligns the reference image and the input image. In some embodiments, the image-alignment device uses subsampled images to obtain an approximate alignment. For example, in some embodiments, the preprocessed input image (e.g., as shown in FIG. 5(A) is subsampled, thereby generating a subsampled input image (e.g., as shown in FIG. 5(B)). Also, the preprocessed reference image is subsampled, thereby producing a subsampled reference image. The image-alignment device then aligns the subsampled input image to the subsampled reference image. To perform the alignment, some embodiments of the image-alignment device use cross correlation. An example of the alignment result from cross-correlation is shown in FIG. 5(C), and a one-dimensional profile in the horizontal direction (x axis) of the cross correlation is shown in FIG. 5(D). The operations in block B340 generate a global shift 302, which is a value that indicates a shift (e.g., in x and y values) that was performed on the preprocessed input image to align it with the preprocessed reference image, and a globally-aligned input image, which is a preprocessed input image that has been shifted by the global shift 302. Some embodiments use a more complex global alignment that may account for other image transformations beyond x and y shifts. For example, some embodiments consider in-plane rotation, image scaling, or image skew.

FIGS. 5(E) and 5(F) show the differences between a preprocessed reference image and a preprocessed input image before and after the global alignment.

Figure 6:
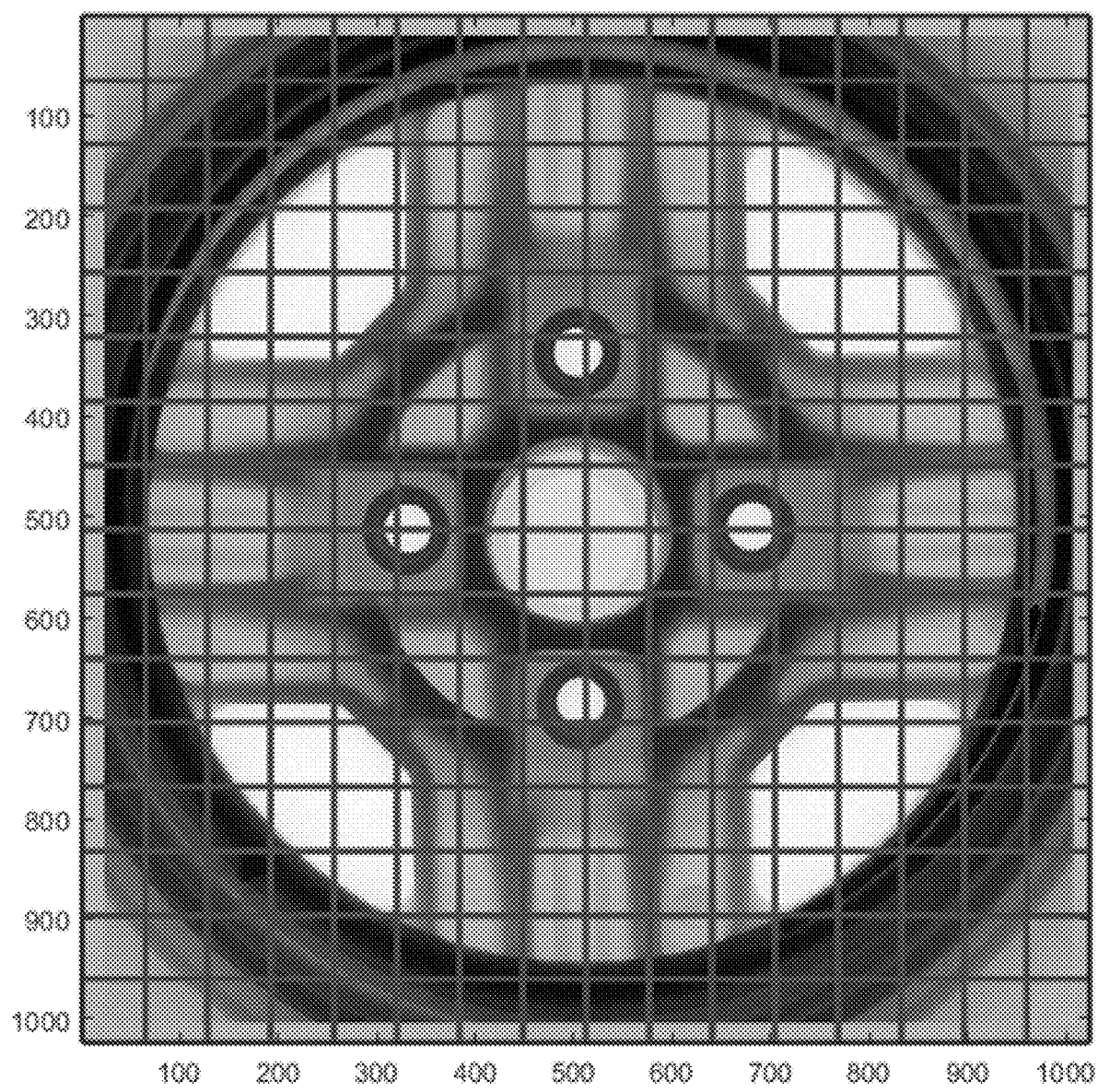
FIG. 6 illustrates an example embodiment of an image that has been split into subfields.

The second flow then moves to block B345, where the image-alignment device obtains subfields (e.g., patches, areas) in the globally-aligned input image and the preprocessed reference image 301, for example by splitting or dividing the images into equally-sized areas. In some embodiments, each subfield includes only a few pixels, and, in some embodiments, each subfield includes many pixels. Also, in some embodiments, the subfields overlap. FIG. 6 illustrates an example embodiment of an image that has been split into non-overlapping subfields.

Figure 7:
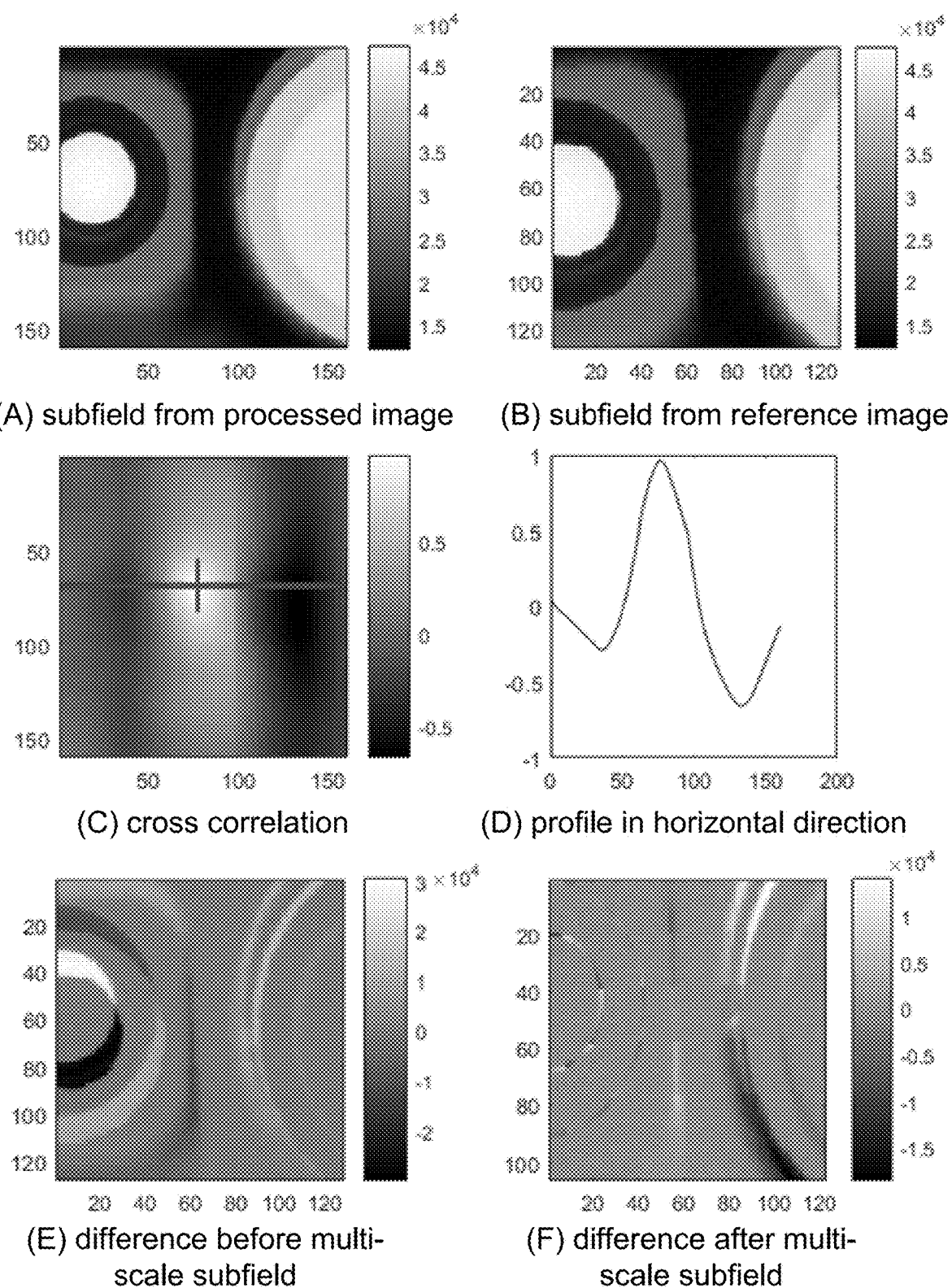
FIG. 7 illustrates an example of an image subfield that was aligned using cross correlation.
Figure 24:
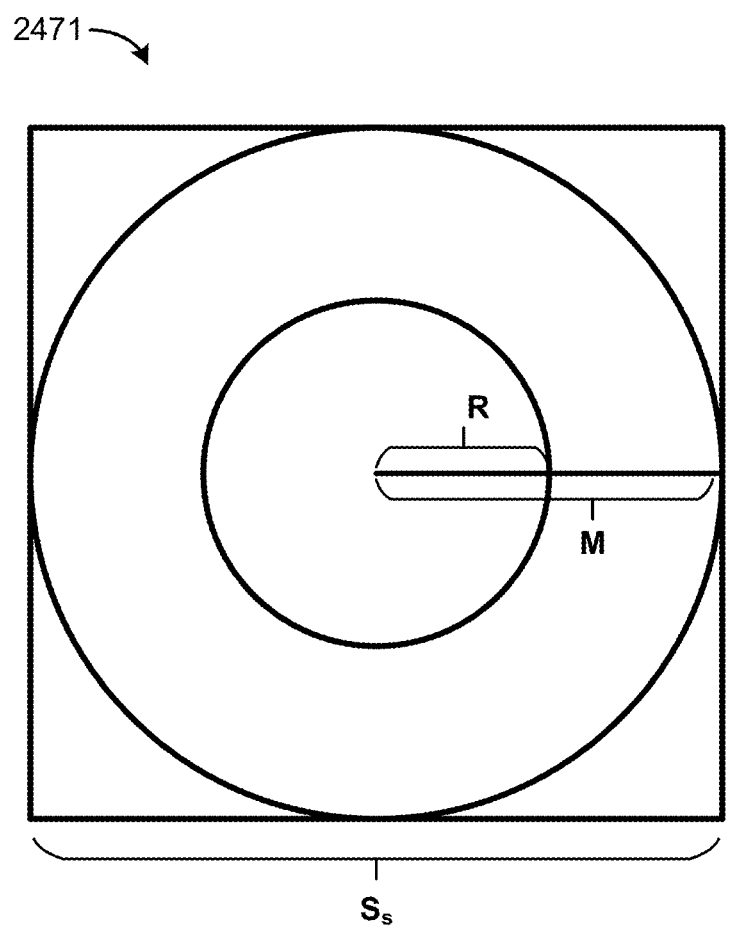
FIG. 24 illustrates an example embodiment of a circular weighted mask that may be used for cross correlation.
Figure 26:
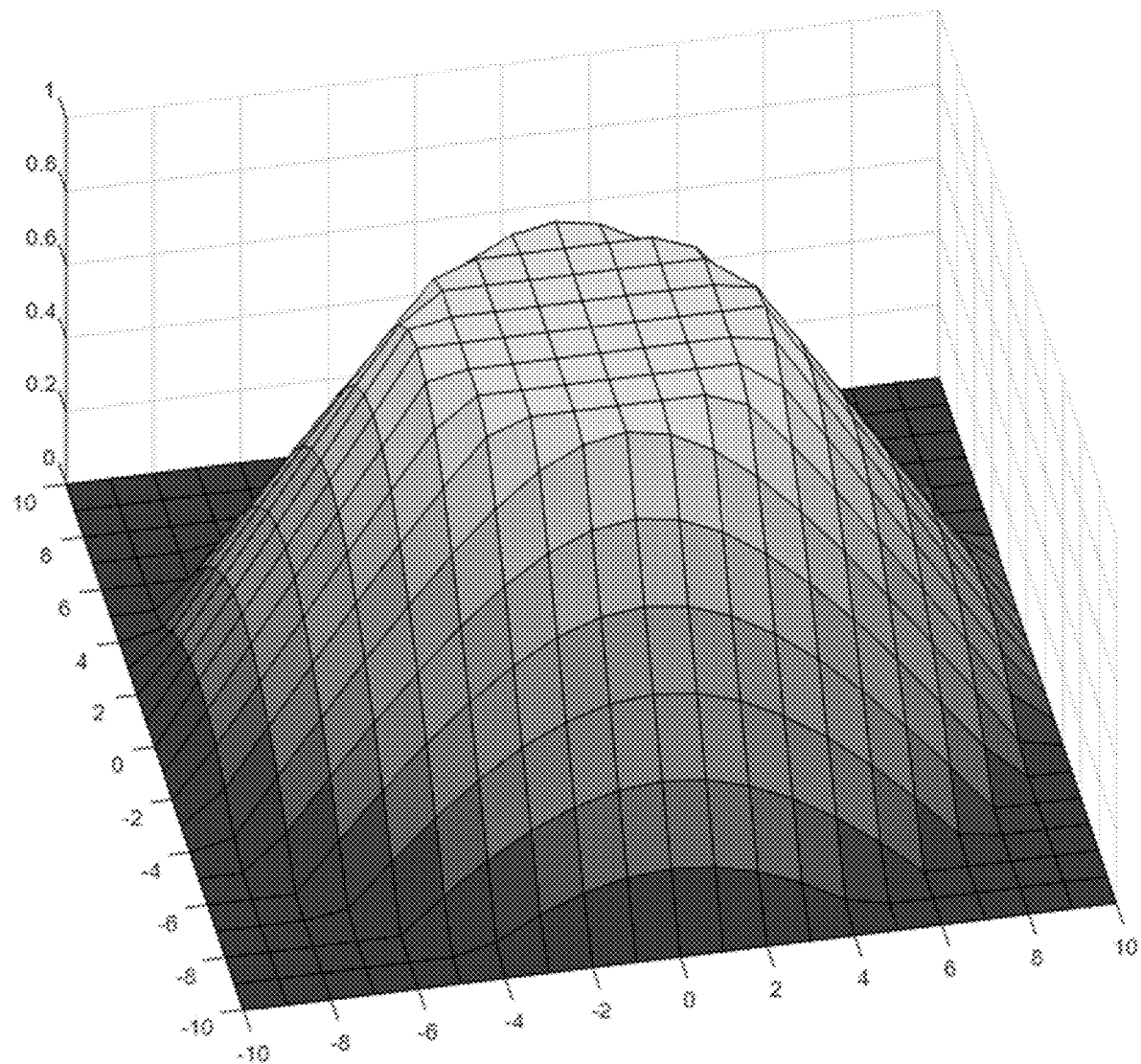
FIG. 26 illustrates an example embodiment of a circular weighted mask.
Figure 27:
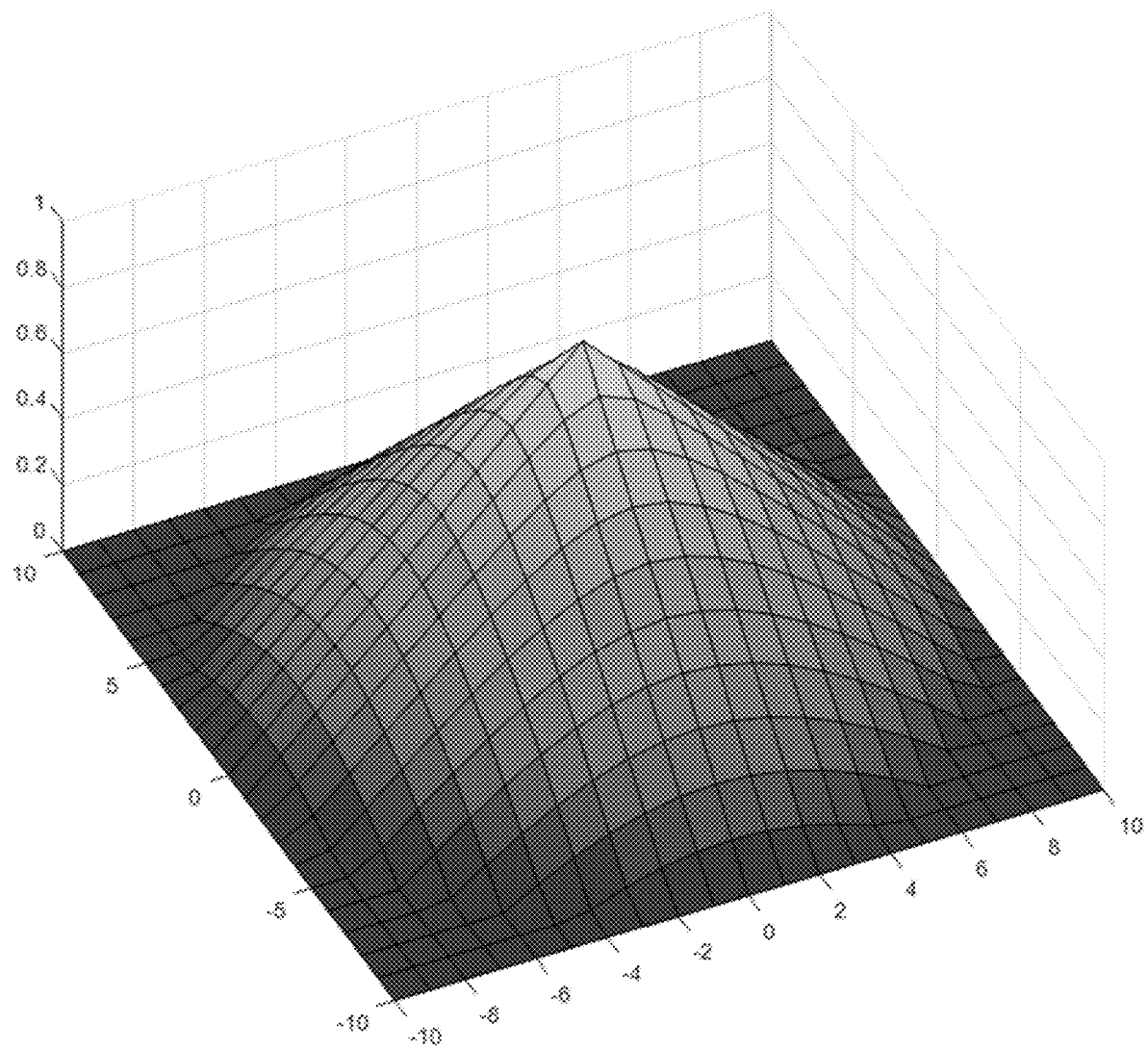
FIG. 27 illustrates an example embodiment of a circular weighted mask.

Next, in block B350, the image-alignment device performs multi-scale subfield alignment (MSS alignment), which aligns each subfield in the globally-aligned input image with the corresponding subfield in the reference image 301. Some embodiments of the image-alignment device use cross correlation to perform the alignment. Also, some embodiments of the image-alignment device use a weighted circular mask (e.g., as shown in FIG. 24, FIG. 26, or FIG. 27) to perform the cross correlation. FIG. 7 illustrates an example of an image subfield that was aligned using cross correlation. As shown in FIG. 7, a subfield of a processed input image (FIG. 7(A)) is compared with the corresponding subfield of a reference image (FIG. 7(B)). The image-alignment device calculates the cross-correlation coefficients for all possible shifts, as shown in FIG. 7(C), and then identifies the peak of the cross-correlation coefficients. FIG. 7(C) shows the peak as a cross. FIG. 7(D) also shows the horizontal profile across the peak. Finally, FIGS. 7(E) and (F) show the intensity difference between the subfield of the globally-aligned input image and the corresponding subfield of the reference image before MSS alignment and after MSS alignment. FIG. 7(F) shows a significant improvement over FIG. 7(E). The image-alignment device performs the MSS alignment for multiple subfields, and, in some embodiments, performs the MSS alignment for all the subfields.

Figure 8:
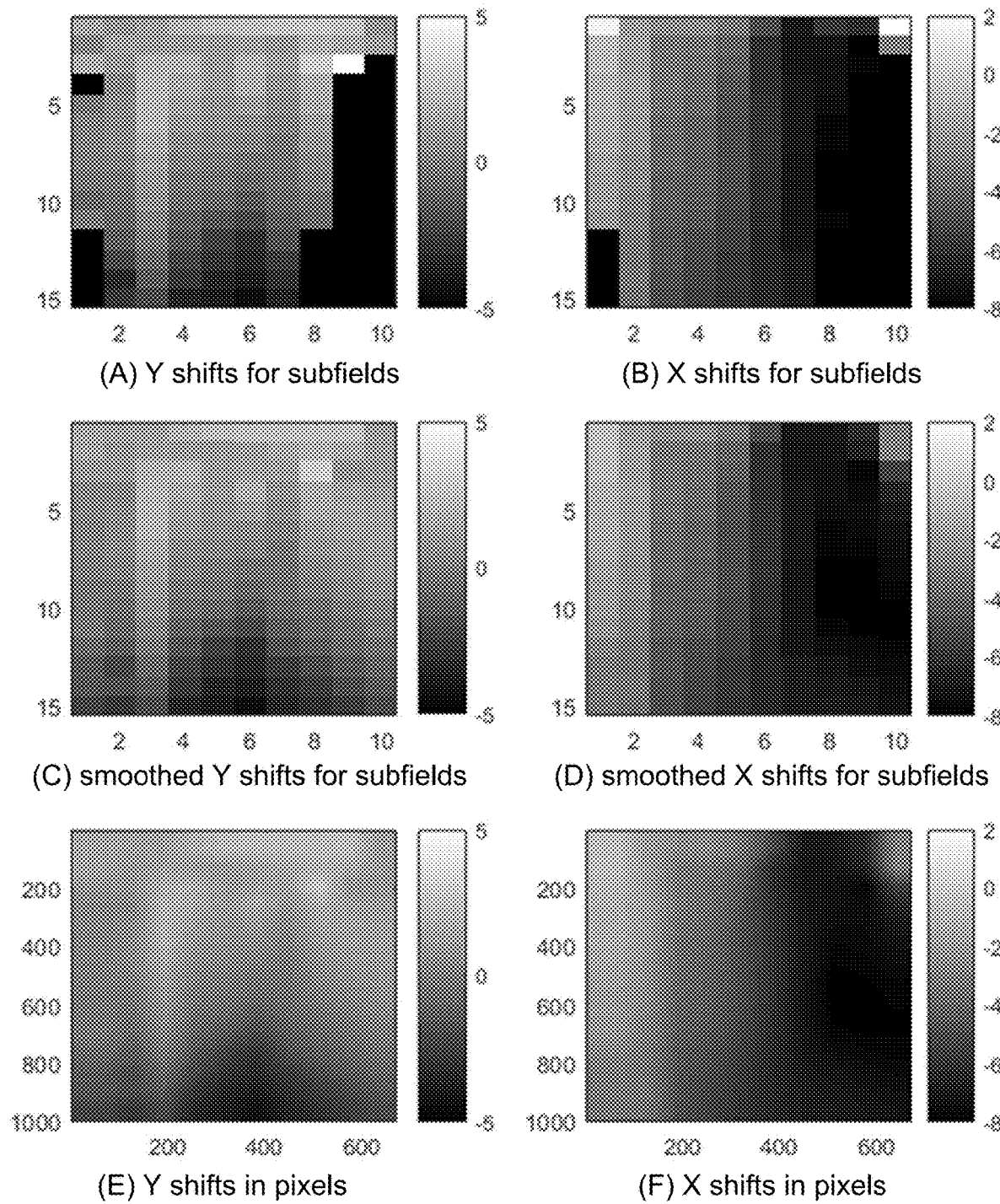
FIG. 8 illustrates the results of an example embodiment of multi-scale subfield (MSS) alignment.

The operations of block B350 generate one or more MSS-alignment shifts 303, each of which indicates the respective shift of a pixel or a group of pixels (e.g., a subfield). FIG. 8 illustrates an example of the results of an embodiment of MSS alignment. FIG. 8(A) shows the resulting MSS-alignment y shifts from selected subfields, and FIG. 8(B) shows the resulting MSS-alignment x shifts from selected subfields. In this embodiment, the image-alignment device applied a smoothing process to identify possible outliers and replaced the possible outliers based on nearby MSS-alignment shift values. The corresponding smoothed MSS-alignment shift results are shown in FIGS. 8(C) and (D). Also, some embodiments of the image-alignment device use interpolation to convert the MSS-alignment x and y shifts of the subfields into respective MSS-alignment x and y shifts of the individual pixels, for example as shown in FIGS. 8(E) and (F).

The image-alignment device then shifts each pixel in the globally-aligned input image by its corresponding MSS-alignment shift 303, thereby producing an MSS-aligned input image. The MSS-aligned input image may be warped relative to the globally-aligned input image.

Figure 9:
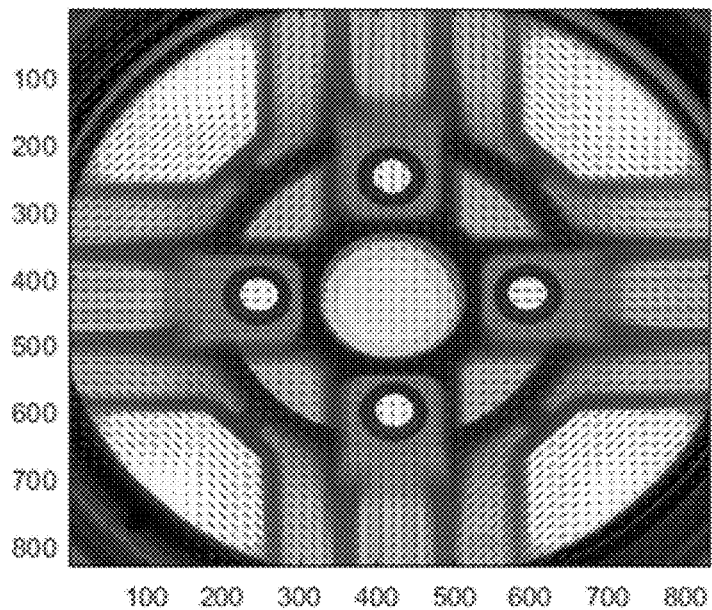
FIG. 9 illustrates the results of an example embodiment of MSS alignment.
Figure 9:
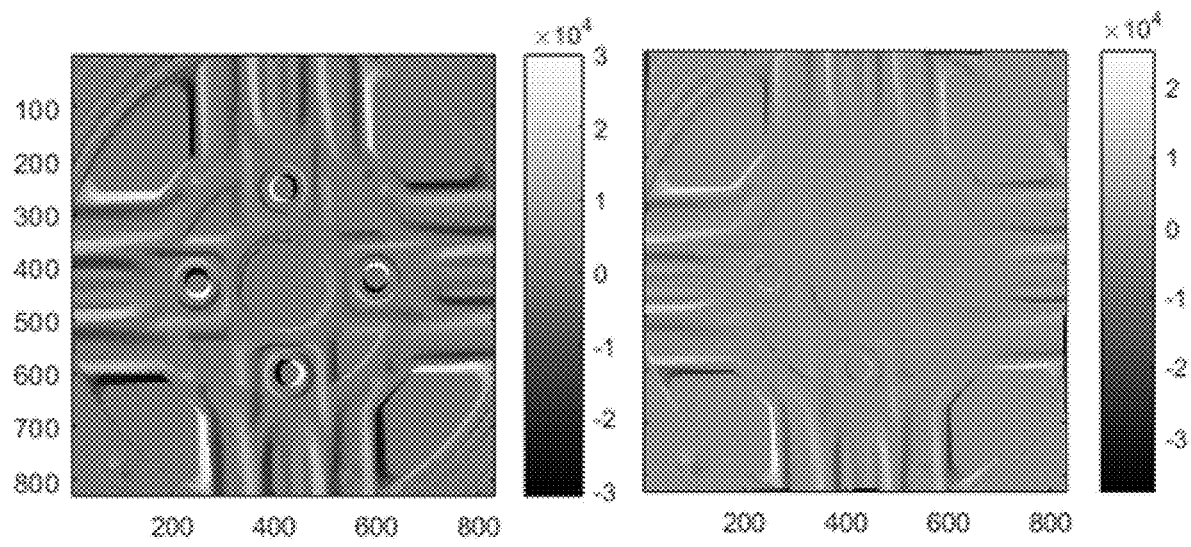

FIG. 9 illustrates an example of the results of an embodiment of MSS alignment. FIG. 9(A) illustrates the interpolated shifts, for selected pixels, that were obtained from MSS alignment for the entire image. The lines show the corresponding shifts between the input image and the reference image for each selected pixel. The differences between the two images before MSS alignment and after MSS alignment are respectively shown in FIGS. 9(B) and (C). Based on the magnitude of the reduction of the pixel intensity differences, the MSS alignment produced a significant improvement. The MSS alignment can also be performed on a border subfield, where only a portion of the subfield can be used to calculate the cross correlation.

The second flow then proceeds to block B355.

Figure 10:
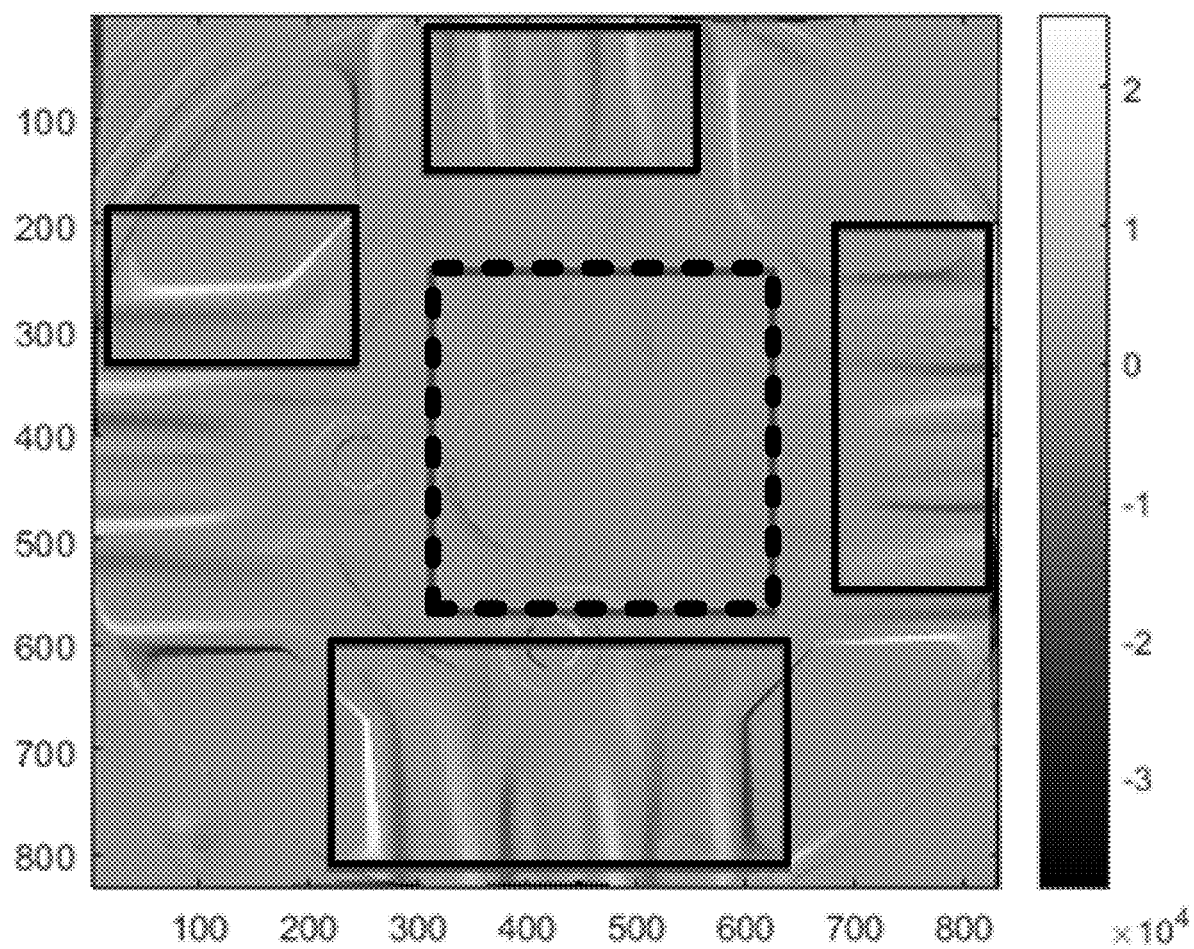
FIG. 10 illustrates the results of an example embodiment of MSS alignment that shows some limitations of MSS alignment.

From block B310, the first flow moves to block B315. In block B315, the image-alignment device obtains (e.g., selects, identifies, generates) anchor points 304 (e.g., fixed-scale anchor points) in the preprocessed reference image. For example, the anchor points 304 may be selected based on the intersections of lines, the intersections of curves, or the intersections of high-order polynomials. As shown in FIG. 10 (which shows the same image as FIG. 9(C)), although MSS alignment can produce good alignment results, in some circumstances MSS alignment will not correct all of the mismatches between two images. In FIG. 10, mismatches are still visible in at least the areas within the rectangles that have solid lines. Compared to the area within the rectangle that has dashed lines (the center rectangle), the other areas have noticeable mismatches. Also, simply repeating the MSS alignment with different sizes of subfields (e.g., larger subfields, smaller subfields) may not reduce the mismatches. Thus, some embodiments of the image-alignment device use anchor points 304 to reduce the mismatches.

Figure 11:
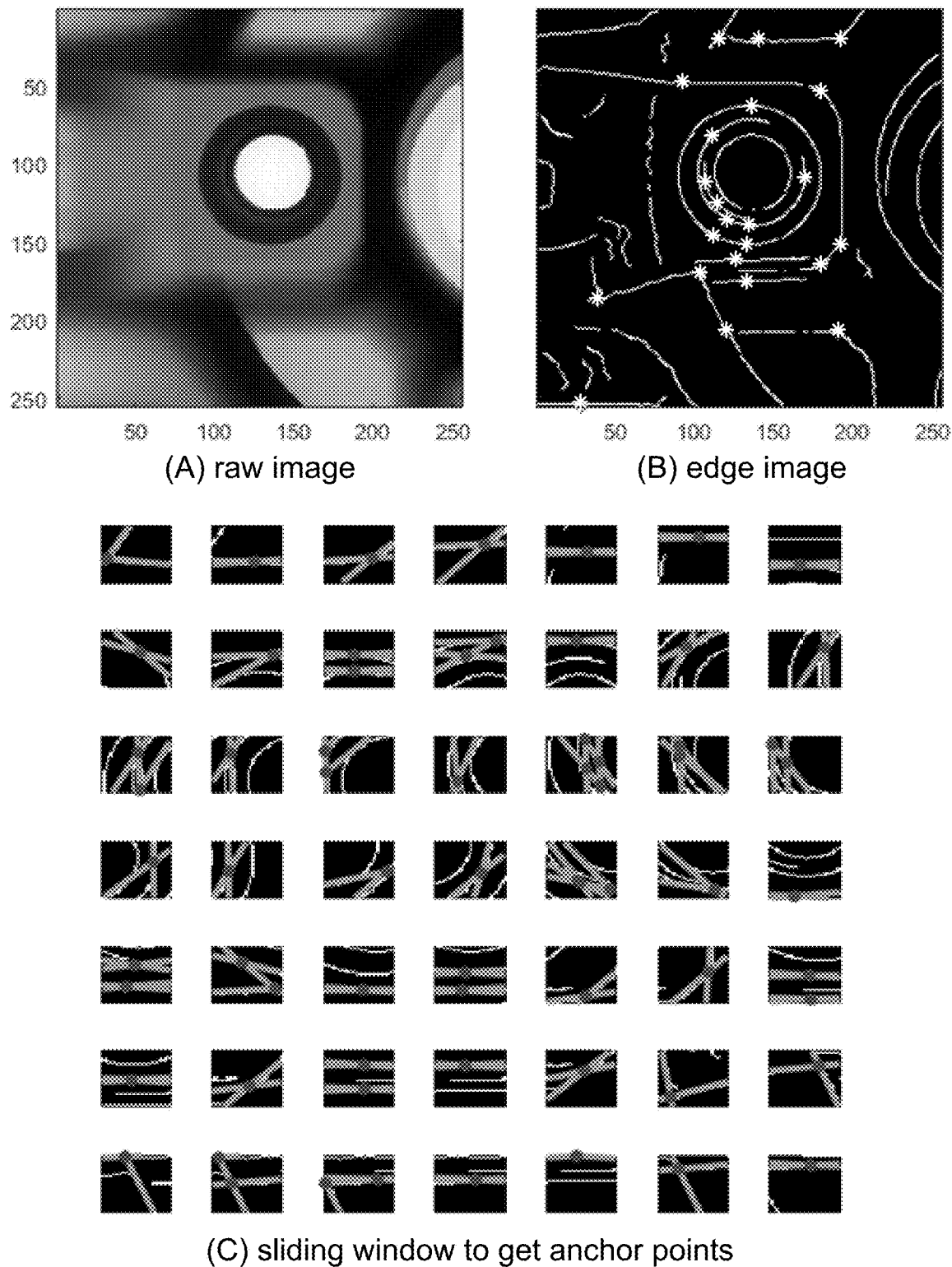
FIG. 11 illustrates example embodiments of anchor points in an image subfield.

FIG. 11 illustrates example embodiments of anchor points 304 in a subfield of an image. In this embodiment, the anchor points 304 are the positions of intersections of lines, which may be identified from the edge points in the image. Unlike plane alignment, which has two axes of freedoms, and unlike line alignment, which has one axis of freedom, the intersections of lines have no freedom to shift on the x and y axes, and each intersection generates a respective unique position, which can be used to shift images or image subfields into alignment.

Figure 12:
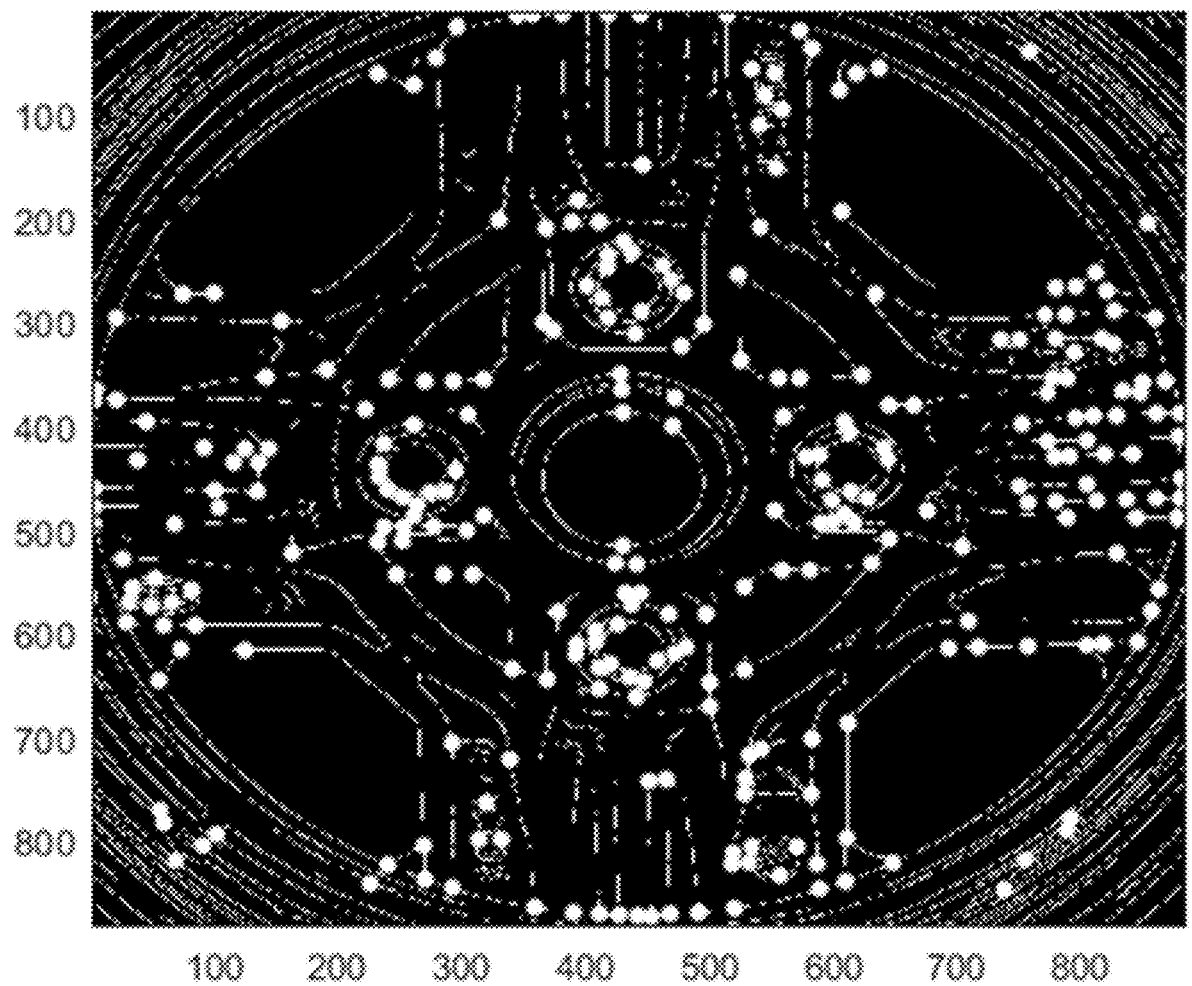
FIG. 12 illustrates example embodiments of anchor points in a complete image.

FIG. 11(A) shows a subfield (e.g., a patch) from an image. FIG. 11(B) shows an edge image that was generated by performing edge detection on the subfield that is shown in FIG. 11(A). The white stars in FIG. 11(B) are the anchor points 304, which were generated from the intersections of the lines. In some embodiments, the operations that obtain these anchor points 304 split the subfield into many sub-subfields (e.g., sub-patches) and then identify all the lines and curves in each sub-subfield and the intersections of the lines and curves. Also, some embodiments move a sliding window over the image and identify all of the anchor points 304 that are currently visible in the sub-subfield that is framed by the sliding window. FIG. 11(C) shows examples of the sub-subfields and their respective intersections. For ease of illustration, only a small number of the sub-subfields that contain anchor points 304 are displayed in FIG. 11(C). FIG. 12 shows an example of the anchor points 304 in a complete image.

After the image-alignment device has obtained the anchor points 304 in block B315, the first flow moves to block B320. In block B320, the image-alignment device obtains anchor-edge points 305, which are dynamic-scale anchor-edge points 305 in this example embodiment. Depending on the spatial structure of the object in the image, there could be some areas in the image that contain few or no anchor points 304. In such areas, the x and y shifts (in pixels) may need to be interpolated based on the anchor points 304. This interpolation may reduce the precision of the alignment.

Figure 13:
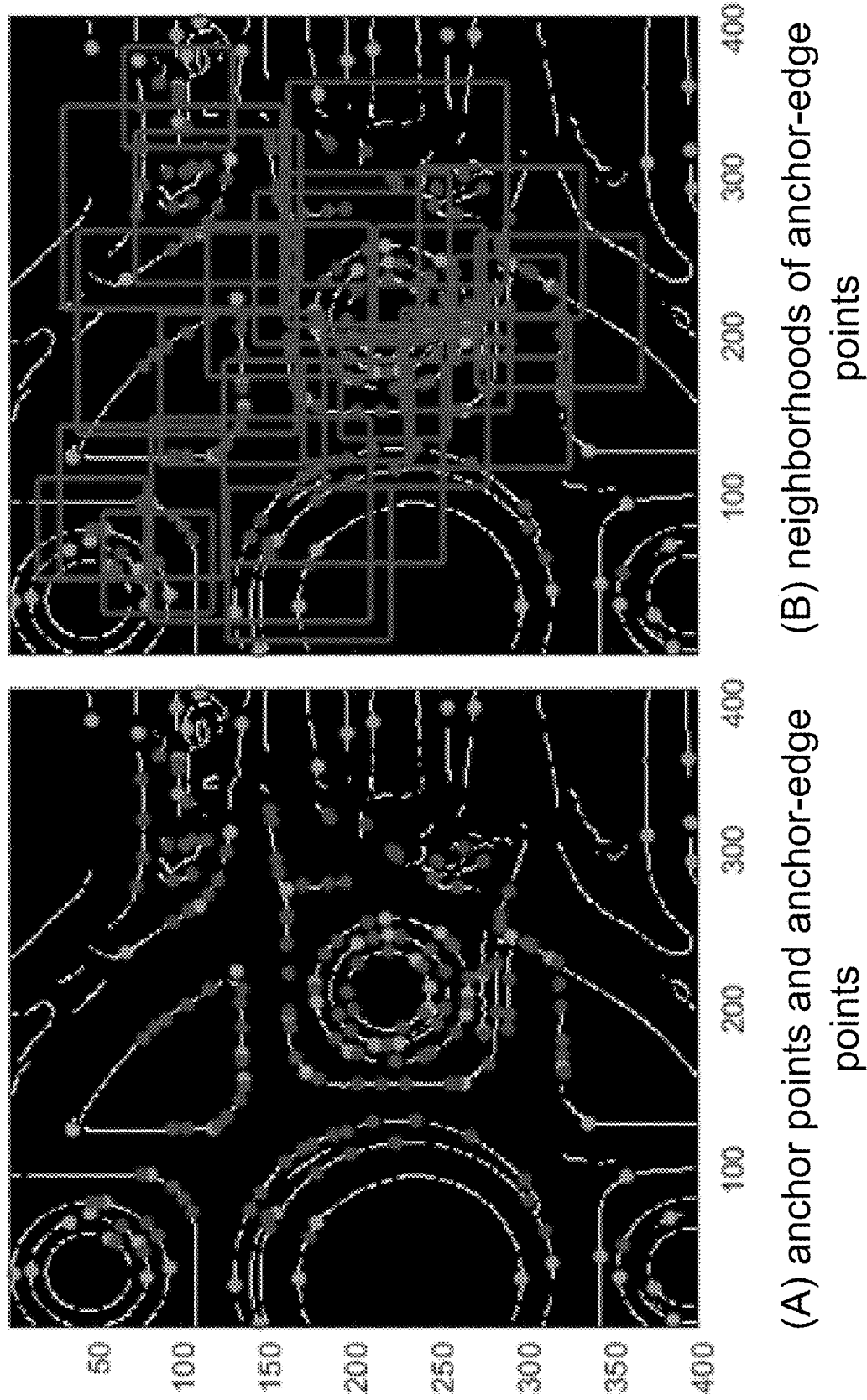
FIG. 13 illustrates example embodiments of anchor-edge points.

Thus, some embodiments use anchor-edge points 305 as second-level pivots, which may eliminate or reduce such interpolation. Anchor-edge points 305 are edge points (e.g., points on a line segment that are not on a corner) that were detected by the edge detection. Instead of using the intensively-sampled edge points as anchor-edge points 305, some embodiments use just a few (e.g., one, two) edge points in one small sub-subfield (e.g., 8 by 8 pixels). Each anchor-edge point 305 may be associated with one or more anchor points 304 that were obtained in block B315, and each anchor point 304 may be associated with one or more anchor-edge points 305. FIG. 13 illustrates example embodiments of anchor-edge points 305. FIG. 13(A) shows the anchor points 304 (in lighter gray) and the anchor-edge points 305 (in darker gray).

The first flow then moves to block B325, where the image-alignment device obtains neighborhood areas 306 for the anchor-edge points 305. In some embodiments, a neighborhood area 306 contains at least two to four anchor points 304. A neighborhood area 306 with more than two anchor points 304 may guarantee that there is enough spatial information for alignment. Some of the anchor-edge points 305 and their associated neighborhood areas 306 are shown in FIG. 13(B). The neighborhood areas 306 do not need to be identical in some embodiments—thus, they can have different shapes, different sizes, etc.

Then the first flow ends in block B360.

Once the second flow has moved to block B355, the image-alignment device uses the anchor points 304, the anchor-edge points 305, and the neighborhood areas 306 to perform anchor-point multi-scale-subfield alignment (APMSS) on the preprocessed reference image 301 and on the MSS-aligned input image. The image-alignment device aligns each of the neighborhood areas 306 in the MSS-aligned input image with the corresponding neighborhood area in the preprocessed reference image 301. To perform the alignment of the neighborhood areas 306, the image-alignment device may use cross correlation on the anchor points 304 and on the anchor-edge points 305. Some embodiments of the image-alignment device use a weighted circular mask (e.g., as shown in FIG. 24, FIG. 26, or FIG. 27) to perform the cross correlation.

The operations of block B355 generate one or more APMSS-alignment shifts 307, each of which indicates the respective shift of a pixel or a group of pixels (e.g., a subfield). The image-alignment device then shifts each pixel in the MSS-aligned input image by its corresponding APMSS-alignment shift 307, thereby producing an APMSS-aligned input image 308. The APMSS-aligned input image may be warped relative to the globally-aligned input image and the MSS-aligned input image.

Then the image-alignment device may send the APMSS-aligned input image to another device, store the APMSS-aligned input image, or perform other operations on or with the APMSS-aligned input image (e.g., use the aligned images of non-defective images to build nominal object models, search for defects in the APMSS-aligned input image, or cause the APMSS-aligned image to be displayed on a display device). The flow then ends in block B360.

Figure 14:
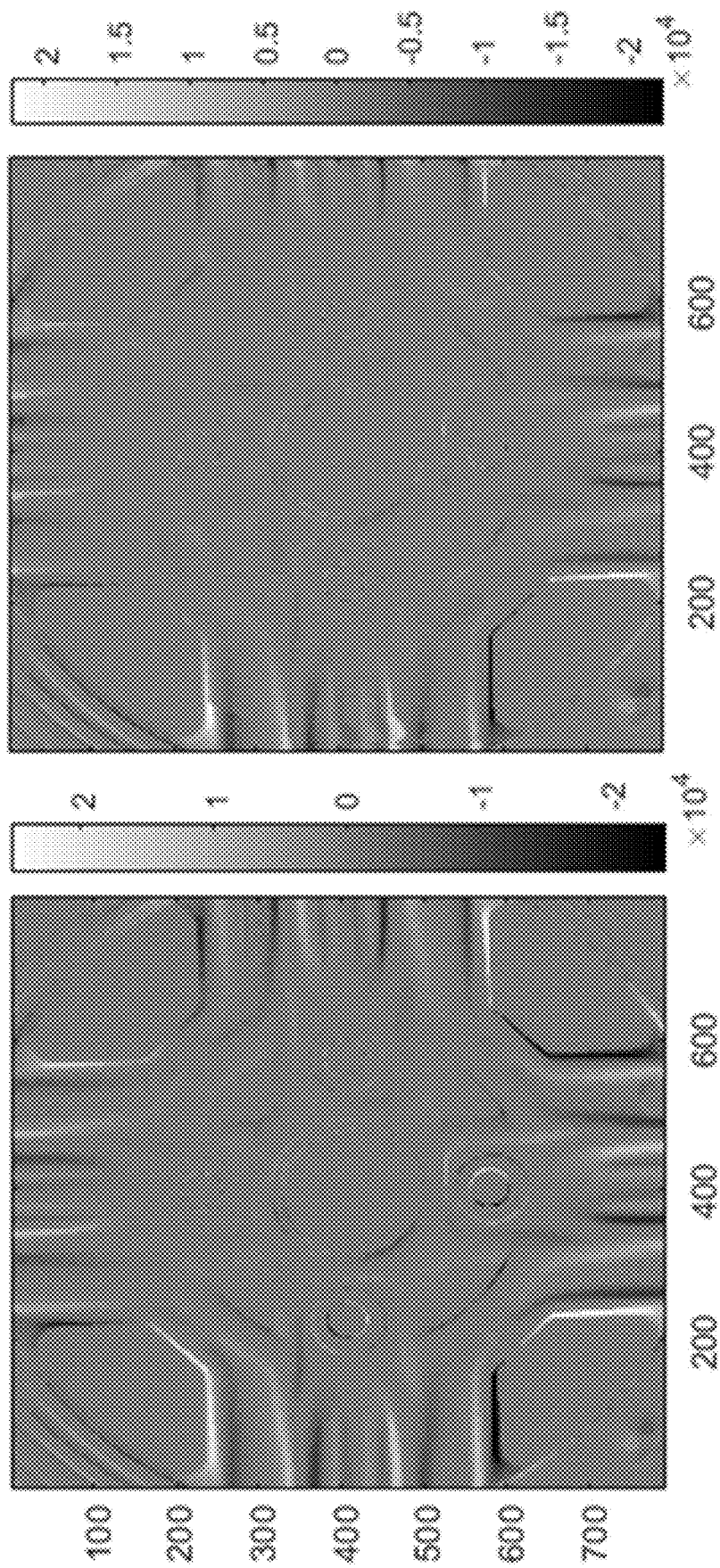
FIG. 14 illustrates example embodiments of the differences between a reference image and an MSS-aligned image and the differences between a reference image and an anchor-point multi-scale-subfield-aligned (APMSS-aligned) image.

FIG. 14 illustrates example embodiments of the differences between a reference image and an MSS-aligned image and the differences between a reference image and an APMSS-aligned image. The differences between the reference image and the MSS-aligned image are shown on the left, and the differences between the reference image and the APMSS-aligned image are shown on the right. The APMSS-aligned image shows an improvement relative to the MSS-aligned image.

Figure 15A:
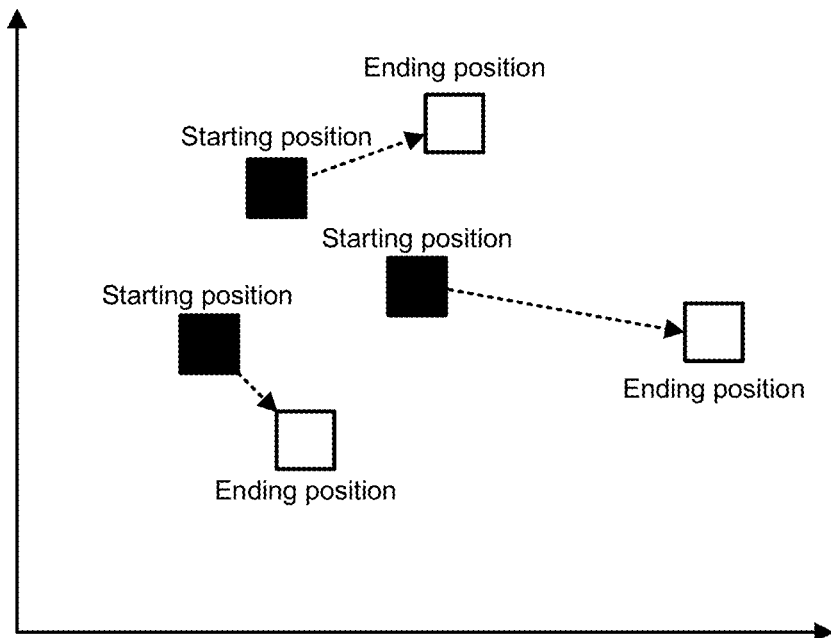
FIG. 15A illustrates an example embodiment of pixel shifts.

FIG. 15A illustrates an example embodiment of pixel shifts. FIG. 15A shows the starting positions of three pixels, which are then shifted according to one or more pixel shifts (e.g., a global-alignment shift, an MSS-alignment shift, an APMSS-alignment shift). FIG. 15A also shows the ending positions of the three pixels. As shown by FIG. 15A, each of the pixels may be shifted differently, so that the distances between the pixels and the spatial orientations of the pixels changes. These changes may warp the appearance of the image.

Figure 15B:
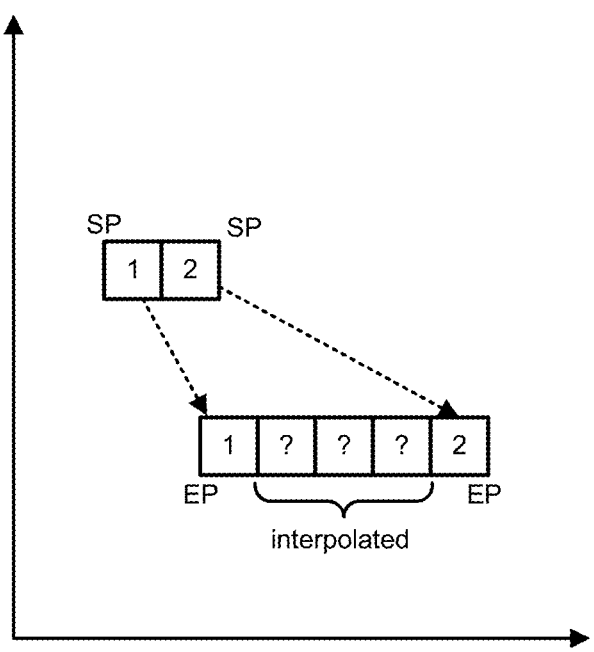
FIG. 15B illustrates an example embodiment of pixel interpolation.

FIG. 15B illustrates an example embodiment of pixel interpolation. After two pixels are shifted from their starting points (SP) to their ending points (EP), the distance between the pixels changes. In this example, the two pixels abutted each other in their starting points, but are separated by three pixels once they are shifted to their ending points. Also, in some circumstances, other pixels may not be shifted into the locations of these three pixels. Accordingly, after shifting pixels, the image-alignment device may interpolate the pixels in the post-shift image for which the image-alignment device does not have data.

Figure 16:
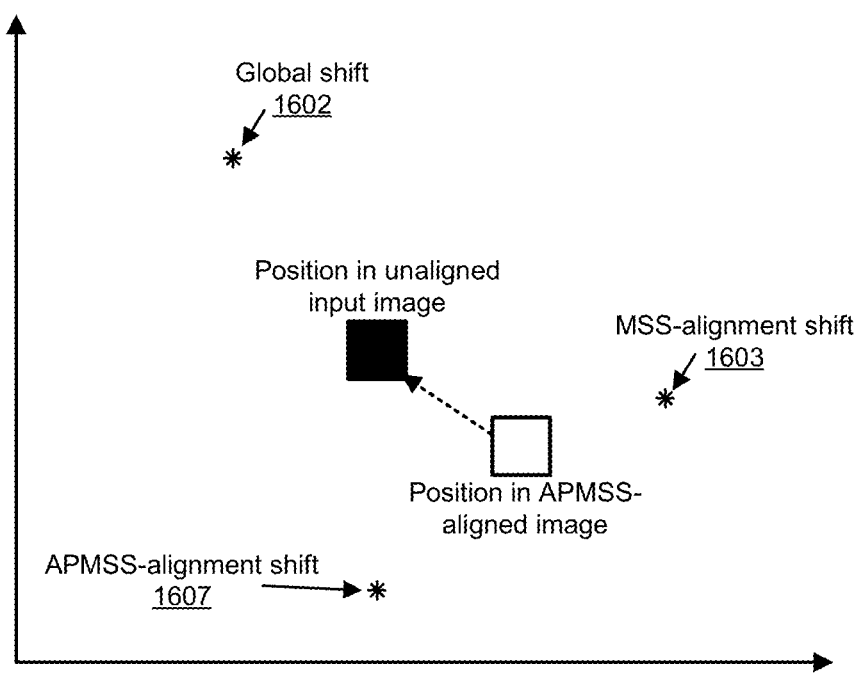
FIG. 16 illustrates an example embodiment of a mapping of a pixel from an APMSS-aligned input image to an unaligned input image.

FIG. 16 illustrates an example embodiment of a mapping of a pixel from an APMSS-aligned input image to an unaligned input image. To identify the pixel in an unaligned image that corresponds to a pixel in a shifted image (e.g., a globally-aligned image, an MSS-aligned image, and APMSS-aligned image), the image-alignment device can use the shifts that were generated by the alignment operations to map the pixel in the shifted image to the corresponding pixel in the unaligned image (e.g., an input image). This example shows a pixel in an APMSS-aligned image that was shifted by global alignment, MSS alignment, and APMSS alignment. The position in the APMSS-aligned image is the aggregate of the three shifts. Using the global shift 1602, the MSS-alignment shift 1603, and the APMSS-alignment shift 1607, the image-alignment device can map the pixel from its position in the APMSS-aligned image to its position in the unaligned image.

Figure 17:
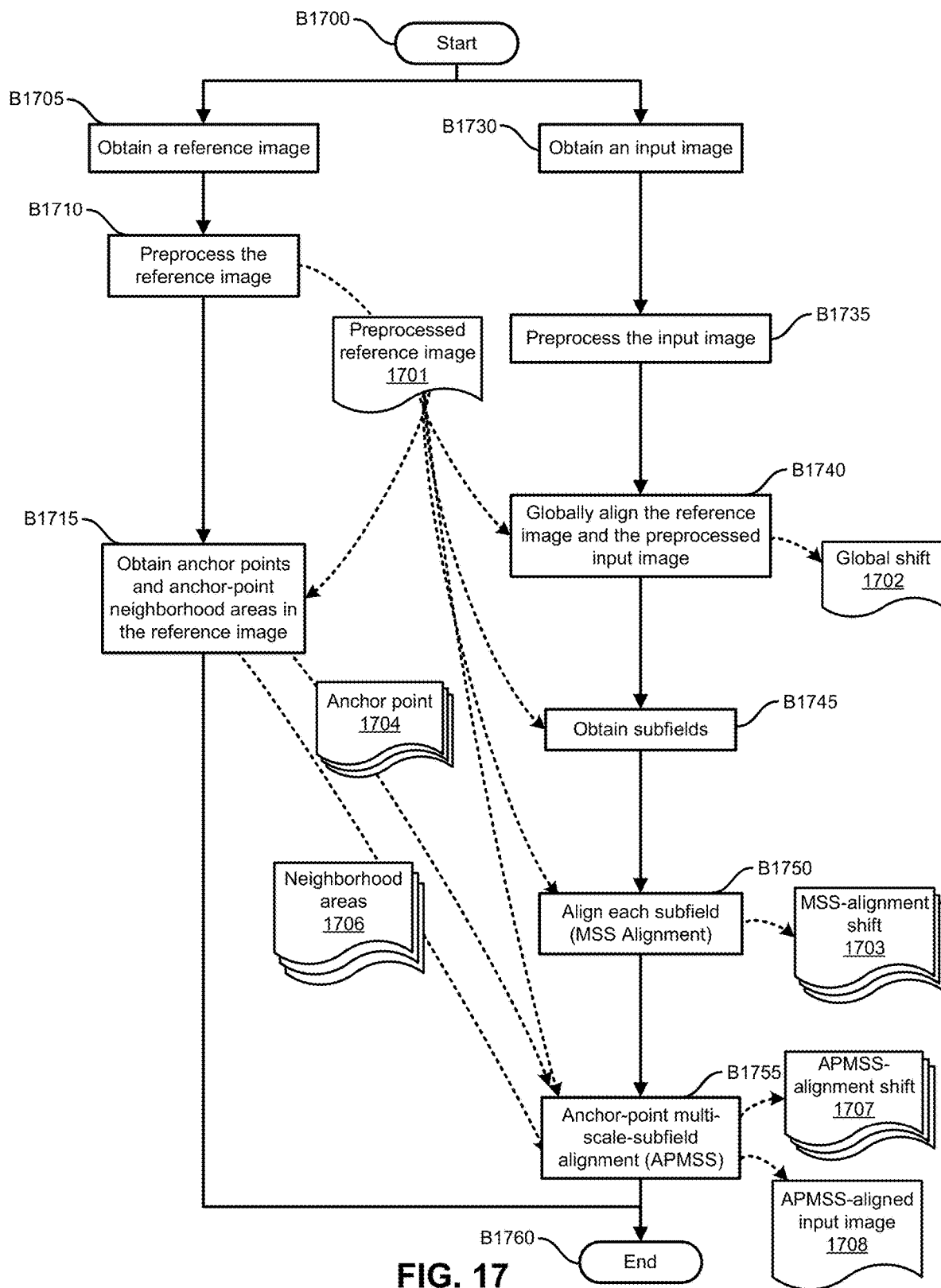
FIG. 17 illustrates an example embodiment of an operational flow for aligning images.

FIG. 17 illustrates an example embodiment of an operational flow for aligning images. The operational flow starts in block B1700 and then splits into a first flow and a second flow. The first flow proceeds to block B1705, where the image-alignment device obtains a reference image (e.g., an image of a defect-free object). Next, in block B1710, the image-alignment device preprocesses the image, thereby generating a preprocessed reference image 1701. After block B1710, the first flow moves to block B1715, which is described below.

From block B1700, the second flow moves to block B1730. In block B1730, the image-alignment device obtains an input image (e.g., a test image, which is an image of an object that is being examined). Next, in block B1735, the image-alignment device preprocesses the input image. Then the second flow moves to block B1740.

In block B1740, the image-alignment device globally aligns the reference image and the input image. The operations in block B1740 generate a global shift 1702 and a globally-aligned input image.

The second flow then moves to block B1745, where the image-alignment device obtains subfields (e.g., patches) in the globally-aligned input image and the preprocessed reference image 1701. Next, in block B1750, the image-alignment device performs multi-scale subfield alignment (MSS alignment), which aligns each subfield in the globally-aligned input image with the corresponding subfield in the preprocessed reference image 1701. The operations of block B1750 generate one or more MSS-alignment shifts 1703. The image-alignment device then shifts each pixel in the globally-aligned input image by its corresponding MSS-alignment shift 1703, thereby producing an MSS-aligned input image. The second flow then proceeds to block B1755.

From block B1710, the first flow moves to block B1715. In block B1715, the image-alignment device obtains (e.g., selects, identifies, generates, detects) anchor points 1704 (e.g., static anchor points, dynamic anchor points) and anchor-point neighborhood areas 1706 in the preprocessed reference image 1701. Some embodiments of the image-alignment device obtain anchor points that are (1) easily identifiable, and (2) good alignment points. Some embodiments use corner points or line intersections where the lines create corners that have a significant angle (e.g., are not parallel or are not nearly parallel). In some circumstances, it is easy to align two or more image line structures in the directions that are orthogonal to the line structures, but not easy to align the image line structures in the directions that are parallel to the line structures. However, if a subfield includes two non-parallel lines, the non-parallel lines will provide strong alignment results in two non-parallel directions, and thus the alignment objective function (e.g., based on cross-correlation) will be well posed. If the lines were parallel, the objective function would have one degree of freedom (for example, be alignable only in the x direction, not in the y direction), and the alignment problem would be ill-conditioned.

When obtaining the anchor points, some embodiments of the image-alignment device validate the detected anchor points based on an input image. In some of these embodiments, the anchor-point location is shifted by small amounts and cross correlations are performed between the input image and the reference image in the neighborhood area of the shifted anchor point. If the anchor point is good (e.g., stable in alignment), the local alignments found from the shifted anchor points should be consistent with each other after compensating for the shift amounts. For example, if the image-alignment device shifts the anchor point in the x direction by 1 pixel and performs an alignment of the shifted anchor point in the reference image to the input image, the required shift should be the same as the alignment shift found from the original anchor point. Also, these embodiments may examine the consistency and stability of the alignment in the local neighborhood area. Some embodiments examine the standard deviation of the detected shifts (compensated for the anchor-point shift) across several small shifts of the anchor point. If the standard deviation is small, the anchor point is deemed to be stable and good. On the other hand, if the standard deviation is large, the anchor point is discarded due to its inconsistent alignment results. Some example embodiments use four shifts on the anchor points (shift in x by +/−1 and shift in y by +/−1). Other example embodiments use eight shifts: (−1,−1), (−1,0), (−1,1), (0,−1), (0,1), (1,−1), (1,0), and (1,1).

And, in block B1715, some embodiments of the image-alignment device find the points in an image that are easily self-alignable. A point that is easily self-aligned using auto-correlation may be a good point to align via cross-correlation with another image if the images are somewhat similar.

In some embodiments, the autocorrelation of a two-dimensional (2D) neighborhood area of size 2w×2w centered at $(x_0, y_0)$ for a function $f(x, y)$ may be described by $$h_{(x_0,y_0)}(x,y) = \int_{-w}^{w} \int_{-w}^{w} f(u-x_0, v-y_0) f(u-x_0+x, v-y_0+y) du\, dv. \quad (1)$$

In the case of digital images, the discrete analogue for a (2w+1)×(2w+1) window size may be described by $$h_{(x_0,y_0)}(x, y) = \sum_{v=-w}^{w} \sum_{u=-w}^{w} f(u - x_0, v - y_0) f(u - x_0 + x, v - y_0 + y). \quad (2)$$

In some embodiments, the auto-correlation is essentially the dot product of the windowed function (pixel values) with itself over a variety of shifts.

Some embodiments of the autocorrelation can be computed using a Fast Fourier Transform. In these embodiments, the shifting of the second term in equation (2) is performed cyclically. Thus, two subfields undergoing the dot product have the same magnitude. According to the Cauchy-Schwartz Inequality, this implies that the autocorrelation function will be maximum at the zero shift and will be less than or equal to the maximum everywhere else. This further implies that the autocorrelation function should be (non-strictly) concave around the zero shifts (An auto-correlation function computed with cyclic shifts may be concave or flat.).

Figure 18:
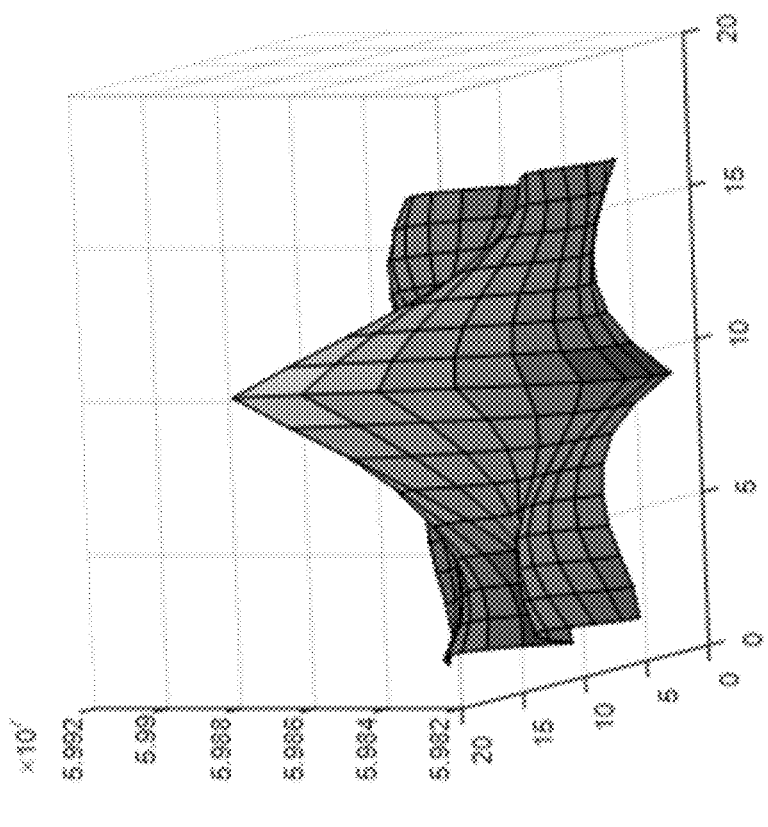
FIG. 18 illustrates an example embodiment of the discrete auto-correlation for two different points in an image.
Figure 18:
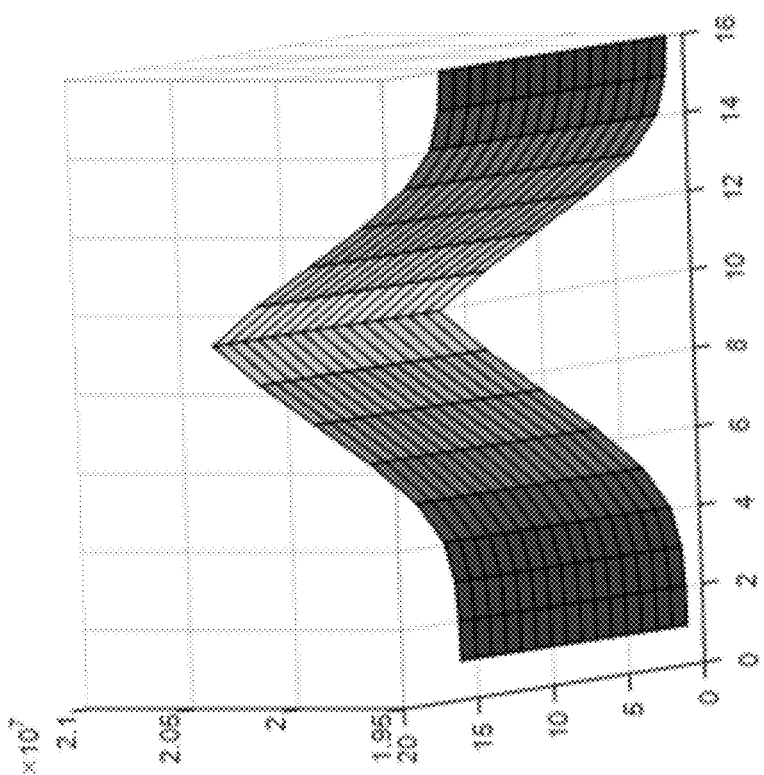

For example, FIG. 18 illustrates an example embodiment of the discrete auto-correlation for two different points in an image. The left graph in FIG. 18 shows a point that is not conducive to alignment because the point presents itself as a ridge-like structure in one direction of the autocorrelation function of a neighborhood area around that point. The ridge indicates that if this point was to be aligned to itself, it is harder to align in one direction (the ridge direction). However, the right graph shows a strong peak structure, which indicates that it would be easy to align this point to itself.

One way to characterize these observations uses the peakiness of the autocorrelation curve. Some embodiments calculate the Hessian matrix of the autocorrelation at the center pixel. As a reminder, the Hessian of a two-dimensional function is the operator on that function:

$$H = \begin{bmatrix} \dfrac{\partial^2}{\partial x^2} & \dfrac{\partial^2}{\partial x \partial y} \\ \dfrac{\partial^2}{\partial x \partial y} & \dfrac{\partial^2}{\partial y^2} \end{bmatrix}. \quad (3)$$

In particular, some embodiments take advantage of the Hessian at the center of the autocorrelation function.

In a continuous autocorrelation function, the Hessian will be a non-positive-definite matrix. This indicates that the eigenvalues of the matrix should be less than or equal to zero. These eigenvalues indicate the concavity of the auto-correlation curve in the most concave direction and the least concave direction. In the left example in FIG. 18, the weakest concavity occurs in the direction of the ridge, and some embodiments use this value to represent the worst-case alignability of that point. Thus, because the autocorrelation function is always concave or flat, the largest eigenvalue of the Hessian should be negative or zero. By negating this eigenvalue, some embodiments generate a score for that point that defines the point's relative alignability.

Some embodiments then generate an alignability map based on the largest eigenvalue of the Hessian of the autocorrelation matrix for a respective neighborhood area around each point in the image.

Because using "brute-force" techniques to perform this calculation can be computationally expensive, some embodiments use other techniques. First, note that estimating the second order partial derivatives of the auto-correlation at the zero alignment point does not require all points of the auto-correlation to be known.

The second derivative can be estimated by a second order difference. Consider the sequence $\{h_1, h_2, h_3, \ldots, h_n\}$. The first difference of this sequence provides a new sequence: $\{h_2-h_1, h_3-h_2, h_4-h_3, \ldots, h_{n+1}-h_n\}$. The second difference of this sequence provides a new sequence:

$$\{h_3-2h_2+h_1, h_4-2h_3+h_2, \ldots, h_{n+1}-2h_n+h_{n-1}\}. \quad (4)$$

Thus, the second order difference at the center depends only on the center value of the auto-correlation and the two immediate neighbors in the direction of the difference. So the second order differences in the x and y directions can be calculated from these values:

$$\begin{matrix} & h_{0,-1} & \\ h_{-1,0} & h_{0,0} & h_{1,0} \\ & h_{0,1} & \end{matrix} \quad (5)$$

Additionally, there are redundant calculations when computing auto-correlation functions centered at different pixels. The autocorrelations are dot products of pixel values in a specified window. The dot product is the sum of the element-by-element products in the window. The element-by-element products may be pre-computed for the five-shift configurations shown in equation (5) across the whole image. The element-by-element products for each shift (s, t) from equation (5) over the entire image may be described by $$p_{s,t}(x,y)=f(x,y)f(x-s,y-t). \quad (6)$$

Moreover, some embodiments use integral images to determine the dot products over the windows of interest. Some embodiments of an integral image can be described by the following:

$$I_{p_{s,t}}(x, y) = \sum_{u=1}^{x} \sum_{v=1}^{y} p_{s,t}(u, v) = I_{p_{s,t}}(x, y-1) + p_{s,t}(x, y). \quad (7)$$

The integral image can be computed in a running accumulation with a single pass over the image p, as can be seen in the last term of equation (7).

In some embodiments, to then find a windowed dot product, the computation of the windowed autocorrelation can be described by the following:

$$h_{s,t,w}(x,y)=I_{p_{s,t}}(x+w,y+w)-I_{p_{s,t}}(x-w-1,y+w)-I_p(x+w,y-w-1)+I_{p_{s,t}}(x-w-1,y-w-1). \quad (8)$$

Furthermore, in some embodiments, non-cyclic auto-correlation calculations are normalized to calculate dot products of unit vectors. Due to the shifts, the shifted windows (e.g., patches, areas, subfields) may vary in magnitude from window to window. Thus, some embodiments normalize the window by the magnitude of the window to create unit vectors. Concerning the magnitude of each window in the image, note that the magnitude squared of each window is the sum of the squares of the image intensities in the window.

This can be computed from the integral image of the zero shifts. Thus, in some embodiments, the normalized auto-correlations, denoted $\tilde{h}$, can be described by the following:

$$\frac{h_{0,-1,w}(x, y)}{\sqrt{h_{0,0,w}(x, y) \cdot h_{0,0,w}(x, y-1)}} \quad (9)$$

$$\frac{h_{-1,0,w}(x, y)}{\sqrt{h_{0,0,w}(x, y) \cdot h_{0,0,w}(x-1, y)}} \quad 1 \quad \frac{h_{1,0,w}(x, y)}{\sqrt{h_{0,0,w}(x, y) \cdot h_{0,0,w}(x+1, y)}}$$

$$\frac{h_{0,1,w}(x, y)}{\sqrt{h_{0,0,w}(x, y) \cdot h_{0,0,w}(x, y+1)}}$$

The normalization guarantees that the term in the center is one and the terms above, below, left, and right are all less than or equal to one.

Some embodiments approximate the Hessian with a diagonal matrix. The center point of the auto-correlation is a local maxima of the auto-correlation function. Because the above normalization guarantees that the center point of the auto-correlation is a local maxima or at least equal to its neighbors, the first derivative at the zero-shift position is zero. Consequently, the off-diagonal terms of the Hessian of the auto-correlation at the zero shift position are zero:

$$\frac{\partial^2}{\partial x \partial y} h = 0. \quad (10)$$

This is a necessary condition for a local maximum.

Additionally, the eigenvalues of a diagonal matrix are the diagonal elements. Thus the Hessian eigenvalues are the second differences of the auto-correlation function in both x and y:

$$\lambda_1(x, y) = \frac{h_{-1,0,w}(x, y)}{\sqrt{h_{0,0,w}(x, y) \cdot h_{0,0,w}(x-1, y)}} + \frac{h_{1,0,w}(x, y)}{\sqrt{h_{0,0,w}(x, y) \cdot h_{0,0,w}(x+1, y)}} - 2; \text{ and} \quad (11)$$

$$\lambda_2(x, y) = \frac{h_{0,-1,w}(x, y)}{\sqrt{h_{0,0,w}(x, y) \cdot h_{0,0,w}(x, y-1)}} + \frac{h_{0,1,w}(x, y)}{\sqrt{h_{0,0,w}(x, y) \cdot h_{0,0,w}(x, y+1)}} - 2. \quad (12)$$

Both eigenvalues are non-positive. The worst-case concavity direction is the direction of the larger eigenvalue (the one closer to zero). Thus, some embodiments create a worse-case concavity score E, based on the negative of the largest eigenvalue, for example as described by the following:

$$E(x,y) = -\max\{\lambda_1(x,y), \lambda_2(x,y)\}. \quad (13)$$

However, some of the previous embodiments may not be ideal when the autocorrelation forms a diagonal ridge-like structure—in which case the approximation may break down. Thus, some embodiments solve for the Hessian by using the nine points around the center of the autocorrelation and fitting them to a two-dimensional second order polynomial. In some embodiments, this may be described by the following function:

$$g(x,y) = a + bx + cy + dxy + ex^2 + fy^2. \quad (14)$$

This may be described by the following matrix M for x from −1 to 1 and y from −1 to 1:

| 1 | x | y | xy | $x^2$ | $y^2$ |
|---|---|---|----|-------|-------|
| 1 | −1 | −1 | 1 | 1 | 1 |
| 1 | −1 | 0 | 0 | 1 | 0 |
| 1 | −1 | 1 | −1 | 1 | 1 |
| 1 | 0 | −1 | 0 | 0 | 1 |
| 1 | 0 | 0 | 0 | 0 | 0 |
| 1 | 0 | 1 | 0 | 0 | 1 |
| 1 | 1 | −1 | −1 | 1 | 1 |
| 1 | 1 | 0 | 0 | 1 | 0 |
| 1 | 1 | 1 | 1 | 1 | 1 |

Then, some embodiments fit the existing normalized autocorrelations as described by the following:

$$\tilde{h} \approx M \cdot [a\ b\ c\ d\ e\ f]^T. \quad (15)$$

Also, the Hessian matrix for g(x, y) in Equation (14) may be described by the following:

$$H_g = \begin{bmatrix} 2e & d \\ d & 2f \end{bmatrix}. \quad (16)$$

The coefficients d, e, and f can be found using a least-squares fit from the last three rows of the pseudoinverse of M, for example as described by the following:

$$[a\ b\ c\ d\ e\ f]^T = (M M^T)^{-1} M^T \tilde{h}. \quad (17)$$

Because M is known and given in the table above, in some embodiments the optimal weightings of the normalized autocorrelation for the d term in (16) can be described by the following:

$$\frac{1}{4} \begin{bmatrix} 1 & 0 & -1 \\ 0 & 0 & 0 \\ -1 & 0 & 1 \end{bmatrix}. \quad (18)$$

Thus, $$\frac{\partial^2}{\partial x \partial y} \tilde{h} = \frac{h_{-1,-1,w}(x, y)}{\sqrt{h_{0,0,w}(x, y) \cdot h_{0,0,w}(x-1, y-1)}} + \frac{h_{1,1,w}(x, y)}{\sqrt{h_{0,0,w}(x, y) \cdot h_{0,0,w}(x+1, y+1)}} - \frac{h_{-1,1,w}(x, y)}{\sqrt{h_{0,0,w}(x, y) \cdot h_{0,0,w}(x-1, y+1)}} - \frac{h_{1,-1,w}(x, y)}{\sqrt{h_{0,0,w}(x, y) \cdot h_{0,0,w}(x+1, y-1)}} \quad (19)$$

Some embodiments of the weightings for the 2e term of equation (16) may be described by the following:

$$\frac{1}{3} \begin{bmatrix} 1 & -2 & 1 \\ 1 & -2 & 1 \\ 1 & -2 & 1 \end{bmatrix}. \quad (20)$$

And some embodiments of the weightings for the 2f term of equation (16) may be described by the following:

$$\frac{1}{3} \begin{bmatrix} 1 & 1 & 1 \\ -2 & -2 & -2 \\ 1 & 1 & 1 \end{bmatrix}. \quad (21)$$

Note that there are only six unknowns in the parametric polynomial model, and some embodiments use nine points around the center of the autocorrelation function. Thus, some embodiments reduce the number of points used to as low as six to reduce the computational expense.

The largest eigenvalue can be found from the characteristic equation of the Hessian matrix, which leads to the following:

$$\lambda_{max} = \frac{\left(\frac{\partial^2}{\partial x^2}\tilde{h} + \frac{\partial^2}{\partial y^2}\tilde{h}\right) + \sqrt{\left(\frac{\partial^2}{\partial x^2}\tilde{h} - \frac{\partial^2}{\partial y^2}\tilde{h}\right)^2 + 4\left(\frac{\partial^2}{\partial x \partial y}\tilde{h}\right)^2}}{2}. \quad (22)$$

The resulting alignability map E may be described by the following:

$$E(x,y) = -\lambda_{max}. \quad (23)$$

Figure 19:
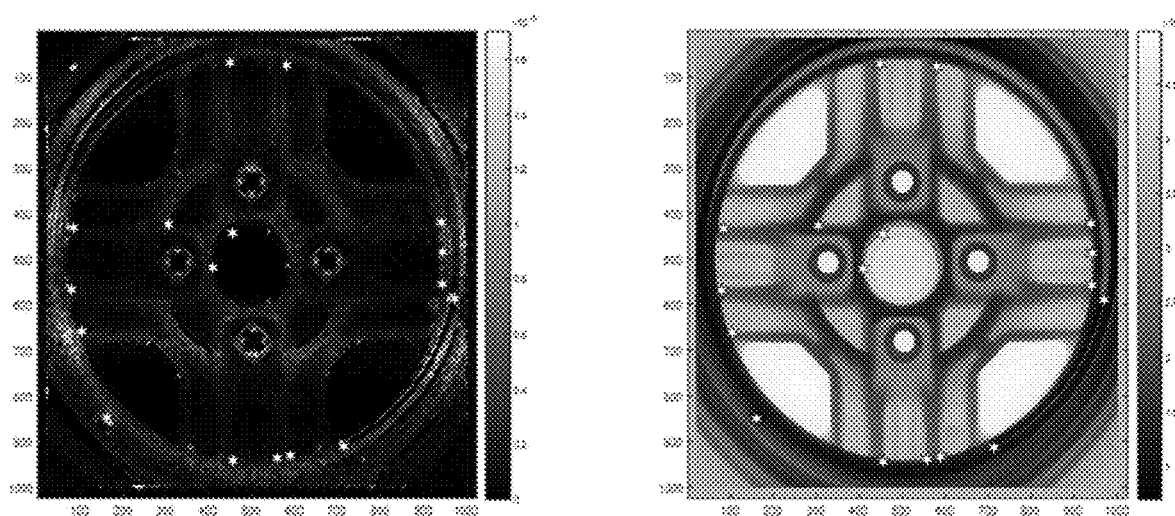
FIG. 19 illustrates an example embodiment of the results of anchor-point detection.

One of the previous embodiments was applied to an x-ray image of a wheel. The results from one embodiment are illustrated in FIG. 19. In FIG. 19, a wheel x-ray image is shown on the right, and the corresponding alignment point-map is shown on the left. Some peaks in the alignment-point map are marked with asterisks, and their corresponding locations are shown on the x-ray image.

Accordingly, some embodiments generate the five to nine images that are described by equations (5), (18), (20), and (21). Each of these images may be generated (e.g., computed) in a number of operations proportional to the number of pixels in the original image. From the five to nine intermediate images, two eigenvalues may be calculated, and the larger of the two eigenvalues at each pixel may then be negated and used to generate an alignability map (a map of the relative alignability of each point in the image).

Also, further processing of the alignability maps E of equations (13) and (23) may be done to detect peaks in the map.

Moreover, these embodiments are not limited to the presence of straight lines. Curved lines that span multiple dimensions may reveal themselves to be alignable features in an image, depending on the window size.

The use of integral images may enable these operations to be easily and efficiently repeated on multiple scales. Equation (8) shows that the analysis scale w can be readily changed to quickly produce the five to nine images of equations (5), (18), (20), and (21).

In some embodiments, a plurality of alignability maps E are generated across a plurality of scales, and the detection of alignment points is determined based on the plurality of alignability maps E across the plurality of scales.

Another benefit of these embodiments is that the stability of the alignment points can be ascertained based on a single image example. These embodiments do not need to use cross-correlations with other images, as the original image contains appropriate information regarding the alignable structures in the image.

Also, given an alignability map (e.g., a map generated from the largest eigenvalue of the Hessian of the autocorrelation matrix) that has a fixed window size for autocorrelation, some embodiments of the image-alignment device select anchor points by using all local maximas in the alignability map as anchor points. However, anchor-point selection based only on local maxima may result in a dense map and may limit the control over the uniformity in the distribution of the anchor points. In contrast, in some embodiments, an ideal distribution for anchor points is an almost uniform distribution of anchor points, which may improve the accuracy of alignment across the whole image. Local-maxima-based anchor-point selection may result in a high computational load for alignment, due to the large number of anchor points detected. Thus, to give control over the distribution of the anchor points, some embodiments divide the alignability map into windows of equal size, and select at least one anchor point within each window, if available.

Some embodiments of the image-alignment device select the location in each window of the alignability map where the alignability value is a maximum. These values are often good candidates for anchor points. Also, some embodiments also have a minimum threshold for the values in the alignability map, and the threshold may be set based on the noise level in the image. This threshold may help to avoid selecting anchor points that are artefacts of the noise in the image. However, this can cause a number of windows to remain empty if no anchor points in the windows were selected due to low values in the alignability map in those windows.

Additionally, the alignment-map profile may depend on the size of the autocorrelation window used in the computing of the autocorrelation. The autocorrelation equation for a discrete image for a (2w+1)×(2w+1) window size can be described by the following:

$$h_{(x_0,y_0,w)}(x, y) = \sum_{v=-w}^{w} \sum_{u=-w}^{w} f(u - x_0, v - y_0)f(u - x_0 + x, v - y_0 + y). \quad (24)$$

Figure 20:
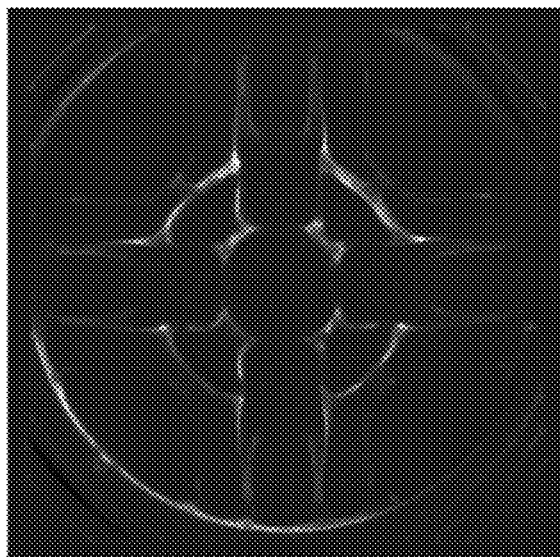
FIG. 20 illustrates example embodiments of alignability maps for different window sizes.
Figure 20:
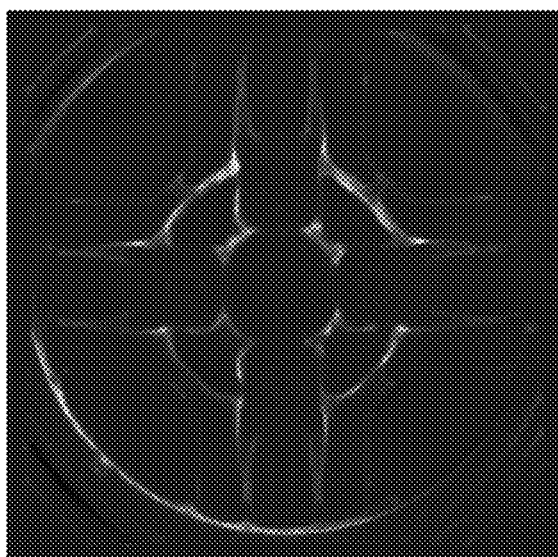
Figure 20:
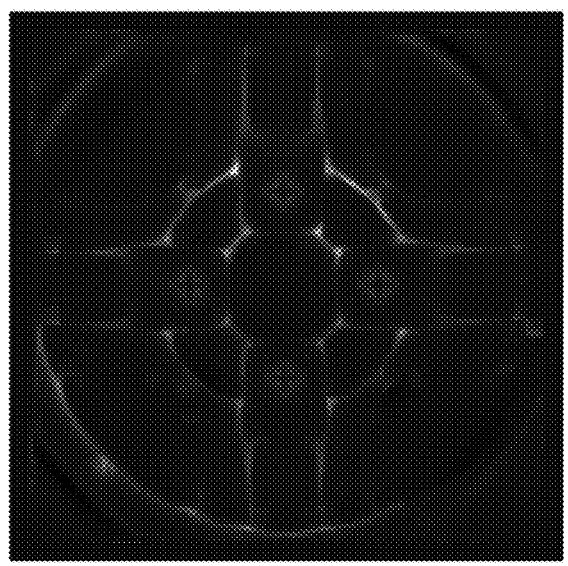
Figure 20:
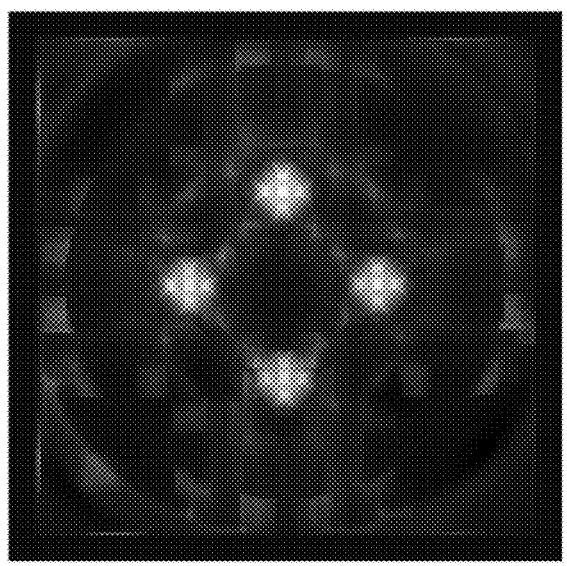

Equation (24) shows that the autocorrelation is a function of window size (2w+1)×(2w+1). The scale of an anchor point may be the window size of the auto correlation. Good features that are smaller than the window size may be well highlighted in the alignability map. Accordingly, regions in the image where the alignability map is weak in one window size may get a stronger alignability map in a different window size, for example as illustrated in FIG. 20, which illustrates example embodiments of alignability maps for different window sizes.

Figure 21:
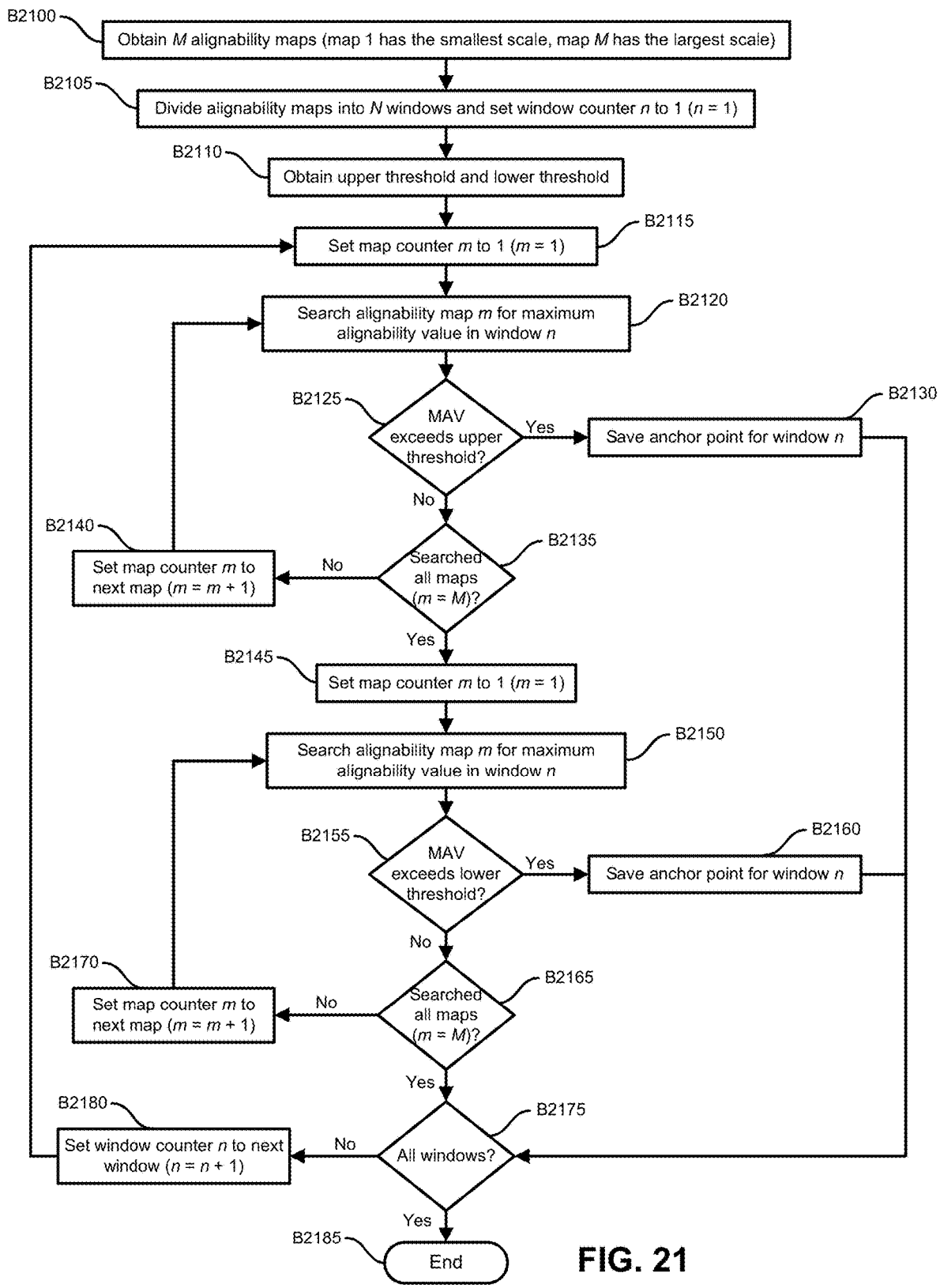
FIG. 21 illustrates an example embodiment of an operational flow to obtain anchor points from alignability maps.

Consequently, the information from the alignability maps for different window sizes can be combined to get a set of anchor points with scales selected for cross correlation with a test image. Some embodiments use the same autocorrelation-window size that was used for autocorrelation in the reference image when performing cross correlation in the input image (the image to be aligned to the reference image). An anchor point may be defined by the location and scale (size of the window) for cross correlation. An example embodiment of an operational flow to obtain anchor points from alignability maps is illustrated in FIG. 21.

After block B1715, the first flow ends in block B1760.

Once the second flow has moved to block B1755, the image-alignment device uses the anchor points 1704 and the neighborhood areas 1706 (e.g., autocorrelation window) to perform anchor-point multi-scale-subfield alignment (APMSS) on the preprocessed reference image 1701 and on the MSS-aligned input image. The image-alignment device aligns each of the neighborhood areas 1706 in the MSS-aligned input image with the corresponding neighborhood area in the preprocessed reference image 1701.

The operations of block B1755 generate one or more APMSS-alignment shifts 1707, each of which indicates the respective shift of a pixel or a group of pixels (e.g., a subfield, a sub-subfield). The image-alignment device then shifts each pixel in the MSS-aligned input image by its corresponding APMSS-alignment shift 1707, thereby producing an APMSS-aligned input image 1708. The APMSS-aligned input image 1708 may be warped relative to the globally-aligned input image and the MSS-aligned input image.

Then the image-alignment device may send the APMSS-aligned input image 1708 to another device, store the APMSS-aligned input image 1708, or perform other operations on or with the APMSS-aligned input image 1708 (e.g., search for defects in the APMSS-aligned input image 1708, cause the APMSS-aligned input image 1708 to be displayed on a display device). The flow then ends in block B1760.

Additionally, applications of the anchor-point operations extend beyond image alignment. As a general key-point detection method, these operations have many useful properties. First, the operations are fast and of computation order O(N), where N is the number of pixels. Second, the operations seek out points that are self-identifiable (i.e., not easily confused with neighboring points). The identification of key-points can be used for general object recognition, image alignment for image stitching, medical imaging, non-destructive testing, etc. Additionally, the key-points may be used for image fingerprinting, image matching, and image search.

FIG. 21 illustrates an example embodiment of an operational flow to obtain anchor points from alignability maps. In block B2100, the image-alignment device obtains M alignability maps ($map_1$, $map_2$, . . . $map_M$), which are arranged in order of scale such that $map_1$ has the smallest scale and $map_M$ has the largest scale. The respective scale of an alignability map indicates the size of the autocorrelation window that was used to generate the alignability map. Next, in block B2105, the image-alignment device divides all the alignment maps into windows, for example using a grid, and sets a window counter n to 1 (n=1). The windows may be the same size and have corresponding positions. For example, some embodiments divide each alignability map into N>>1 equally-sized windows, and window n=1 has the same position in the top-left corner in all of the alignability maps.

The flow then moves to block B2110, where the image-alignment device obtains an upper threshold and a lower threshold. The flow then proceeds to block B2115, where the image-alignment device sets the map counter m to 1 (m=1). Then, in block B2120, the image-alignment searches alignability map m for the maximum value in the window n. In block B2125, the image-alignment device determines if the maximum alignability value (MAV) found in block B2120 for the window n exceeds the upper threshold. If the MAV exceeds the upper threshold (block B2125=Yes), then the flow moves to block B2130. In block B2130, the image-alignment device saves the location of the maximum alignability value in window n as an anchor point with scale m (the scale indicates or defines the neighborhood area of the anchor point). Then the flow proceeds to block B2175.

If an anchor point was not found (block B2125=No), then the flow moves to block B2135. In block B2135, the image-alignment device determines if it has searched all of the alignability maps. If it has not (block B2135=No), then the flow moves to block B2140, where the image-alignment device sets the map counter m to the next map (m=m+1), and then the flow returns to block B2120. If the image-alignment device has searched all of the alignability maps (block B2135=Yes), then the flow proceeds to block B2145.

In block B2145, the image-alignment device sets the map counter m to 1 (m=1). Next, in block B2150, the image-alignment device searches alignability map m for the maximum value in the window n. In block B2155, the image-alignment device determines whether the MAV found in block B2150 for the window n exceeds the lower threshold. If the MAV exceeds the lower threshold, (block B2155=Yes), then the flow moves to block B2160. In block B2160, the image-alignment device saves the location of the maximum alignability value in window n as an anchor point with scale m, and the image-alignment device may define the anchor point by the location of the maximum alignability value and the scale of the alignability map m. The scale indicates or defines the neighborhood area of the anchor point. Then the flow proceeds to block B2175.

If an anchor point was not found (block B2155=No), then the flow moves to block B2165. In block B2165, the image-alignment device determines if it has searched all of the alignability maps. If it has not search all of the alignability maps (block B2165=No), then the flow moves to block B2170, where the image-alignment device sets the map counter m to the next map (m=m+1), and then the flow returns to block B2150. If the image-alignment device has searched all of the alignability maps (block B2165=Yes), then the flow proceeds to block B2175.

In block B2175, the image-alignment device determines if it has searched all of the windows. If the image-alignment device determines that it has not searched all of the windows (block B2175=No), then the flow moves to block B2180, where the image alignment devices sets the window counter n to the next window (n=n+1), and then the flow returns to block B2115. Otherwise (block B2175=Yes), the flow ends in block B2185.

Thus, for a window, if no location exists in an alignment map where the alignment value exceeds the upper threshold for all the alignability-map scales, the image-alignment device searches for the smallest alignability-map scale that has a maximum value that exceeds the lower threshold. If such a point in the window exists, the anchor point is defined by the location of the maximum value and the smallest alignability-map scale that has the point that exceeds the lower threshold value.

And if the image-alignment device cannot find a location in the window where the alignment value exceeds the lower threshold, the image-alignment device does not select any anchor point within that window.

Thus, some embodiments, like the embodiment in FIG. 21, use two thresholds (upper and lower) to give preference to the smallest-scale feature that exceeds a minimum quality. These operational flows initially search for a higher threshold, indicating a higher-quality anchor point, from the smallest alignability-map scale. For the windows in the alignability-map scale that do not have any point that exceeds the upper threshold, the image-alignment device searches for the anchor point using a lower threshold value that is set above the noise level of the alignability map. If none of the alignability maps for a window have a point that exceeds the lower threshold, the image-alignment device stops without finding any anchor point for that window. Additionally, when some embodiments do not find an alignability value above the higher threshold, they use the scale of alignability with the highest alignability value found, provided it is above the lower threshold.

Figure 22:
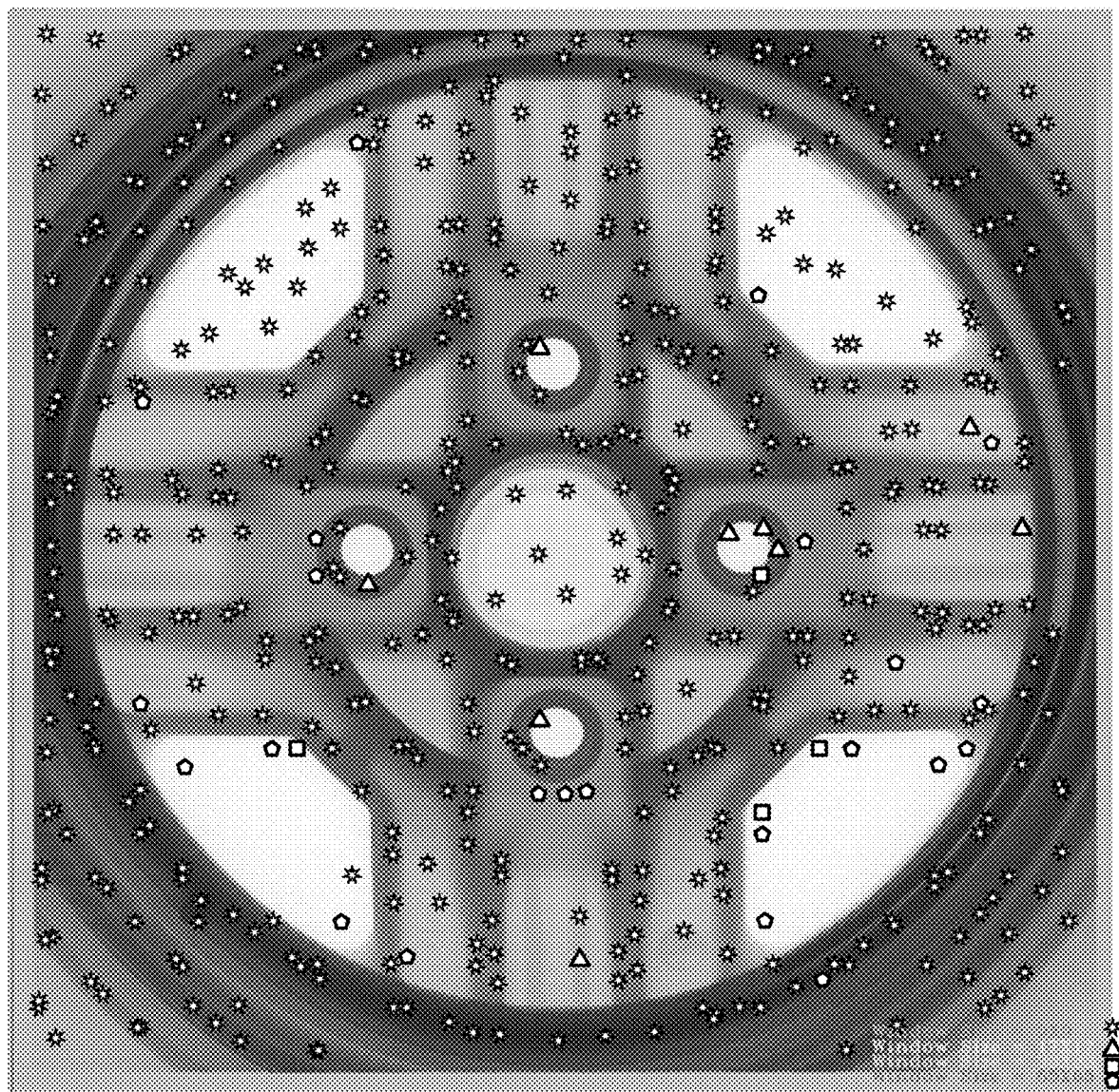
FIG. 22 illustrates example embodiments of anchor points.

FIG. 22 illustrates example embodiments of anchor points. The different shapes for the anchor points indicate the different window sizes (which may be the same as the sizes of the anchor points' corresponding neighborhood areas) associated with those anchor points.

Figure 23:
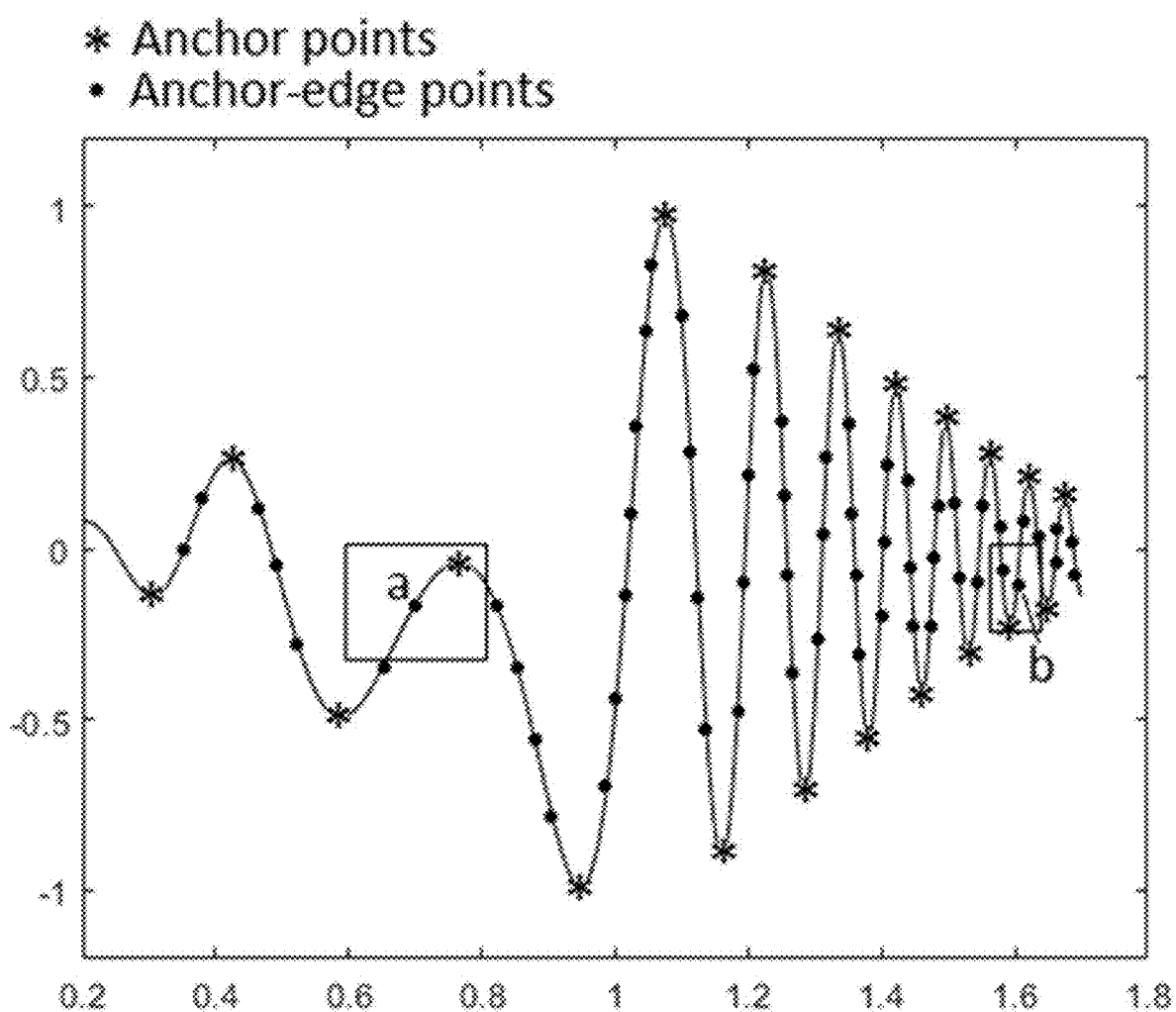
FIG. 23 illustrates example embodiments of anchor points and anchor-edge points.

FIG. 23 illustrates example embodiments of anchor points and anchor-edge points in a one-dimension signal. The signal is unevenly distributed across the horizontal axis. To fully characterize the features of the signal for alignment, some embodiments use the turning points of the curve, plotted as the black stars, as anchor points. However, using only the anchor points to interpolate all the others may produce large errors in the regions between the anchor points. Thus, some embodiments use anchor-edge points, shown as black dots, which serve as a second layer of anchoring positions during image alignment. The combination of anchor points and anchor-edge points permits some embodiment to handle both slowly-changing areas (for example, the area of 'a') and fast-changing areas (the area of 'b'). The corresponding regions for anchor-edge points could be varied depending on the neighboring anchor points.

FIG. 24 illustrates an example embodiment of a weighted circular mask 2471 that may be used for cross correlation. In FIG. 24, $S_s$ is the length of the subfield (and the width if the subfield is a square), R is the inner-circle radius of the mask 2471, and M is the outer-circle radius of the mask. The pixels in the inner-circle radius R contribute fully to the cross correlations, the pixels in the annulus between the inner-circle radius R and the outer-circle radius M contribute only partially to the cross correlations, and the pixels that are outside the outer-circle radius M do not contribute to the cross correlations. In this embodiment, the inner-circle radius R is equal to half the length $S_s$ of the subfield. Also, the contribution of a pixel in the annulus may decrease linearly with distance from the inner-circle radius R.

Figure 25A:
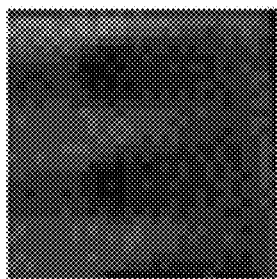
FIG. 25A illustrates example embodiments of a reference-image subfield and an input-image subfield.
Figure 25A:
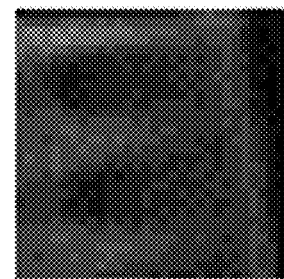
Figure 25B:
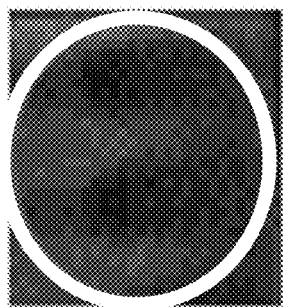
FIG. 25B illustrates example embodiments of the circular central areas of a reference-image subfield and an input-image subfield.
Figure 25B:
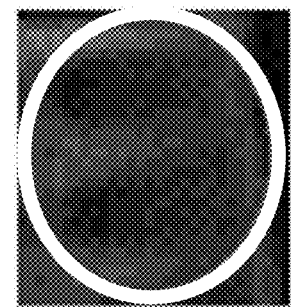
Figure 25C:
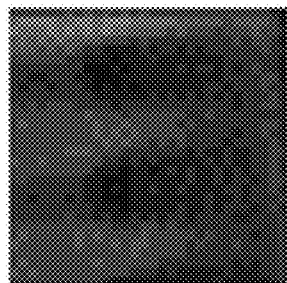
FIG. 25C illustrates example embodiments of a reference-image subfield and the boundary (edge) areas of an input-image subfield.
Figure 25C:
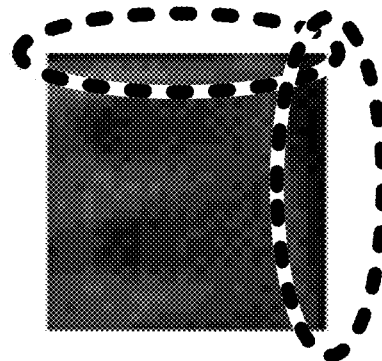

The weighted circular mask 2471 may help to compensate for the rotation when two subfields are rotated relative to each other. FIG. 25A illustrates example embodiments of a reference-image subfield and an input-image subfield. The input-image subfield is rotated relative to the reference-image subfield. FIG. 25B highlights the circular central areas of the reference-image subfield and the input-image subfield. FIG. 25C highlights the boundary (edge) areas of the input-image subfield. As show in FIGS. 25B and 25C, the differences between the reference-image subfield and the input-image subfield are larger at the boundary areas.

The rotations encountered during MSS alignment are often small, and even a pixel-by-pixel comparison of the subfields may be adequately reliable. However, the reliability of the pixel-to-pixel comparison will decrease for the pixels that are farther from the center of the subfield. Specifically, a pixel's location will vary by a distance of $2r \sin \theta/2$, which is approximately $r\theta$ when $\theta$ is small (where $r$ is the distance from the center of the subfield and $\theta$ is the angle of rotation in radians).

Consequently, some embodiments weight the cross-correlations of the subfields so that pixels close to the center of the subfield are weighted as more important or reliable, while pixels further from the center are weighted less.

For example, in some embodiments, the non-weighted cross-correlation used to align a subfield in image f with a subfield in image g may be described by $$h_{(x_0,y_0)}(x, y) = \sum_{v=-w}^{w} \sum_{u=-w}^{w} f(u - x_0, v - y_0) g(u - x_0 + x, v - y_0 + y), \quad (25)$$

where $(x_0, y_0)$ is the subfield center in image f, and where $(x, y)$ is a shift applied to image g. Also some cross-correlations normalize the image subfields.

In some embodiments, the cross correlation applies a weighting function $\omega(u, v)$, for example as described by the following:

$$h_{(x_0,y_0)}(x, y) = \sum_{v=-w}^{w} \sum_{u=-w}^{w} \omega(u, v) f(u - x_0, v - y_0) g(u - x_0 + x, v - y_0 + y). \quad (26)$$

Also, some embodiments of the weighting function $\omega(u, v)$ can be described by the following:

$$W(x, y \mid x_c, y_c) = \begin{cases} 1, & r \leq R \\ \dfrac{M - r}{M - R}, & R < r < M \\ 0, & r \geq M \end{cases} \quad (27)$$

where $$r = \sqrt{(x - x_c)^2 + (y - y_c)^2},$$

and where the circular weighted mask is centered at $x_c, y_c$.

Some embodiments use other weighting functions. For example, some embodiments of the weighting function can be described by one of the following:

$$W(x, y \mid x_c, y_c) = \exp(-a\, r), \quad (28)$$

$$W(x, y \mid x_c, y_c) = \exp(-a\, r^2), \text{ and} \quad (29)$$

$$W(x, y \mid x_c, y_c) = \begin{cases} M - r, & r < M \\ 0, & r \geq M \end{cases}. \quad (30)$$

In some embodiments, the mask center point $x_c, y_c$ is a real value representing a center that is not necessarily at an exact pixel location. In this way, the mask may be centered so that contributions from the region around the center reflect fractional pixel shifts to the center.

An example of the weight values of each pixel of an embodiment of a circular weighted mask are shown in Table 1. The subfield size $S_s$ is 11 pixels, the inner-circle radius R is 4 pixels, and the outer-circle radius M is 6 pixels.

TABLE 1

| 0 | 0 | 0.084524 | 0.307418 | 0.45049 | 0.5 | 0.45049 | 0.307418 | 0.084524 | 0 | 0 |
|---|---|---|---|---|---|---|---|---|---|---|
| 0 | 0.171573 | 0.5 | 0.763932 | 0.938447 | 1 | 0.938447 | 0.763932 | 0.5 | 0.171573 | 0 |
| 0.084524 | 0.5 | 0.87868 | 1 | 1 | 1 | 1 | 1 | 0.87868 | 0.5 | 0.084524 |
| 0.307418 | 0.763932 | 1 | 1 | 1 | 1 | 1 | 1 | 1 | 0.763932 | 0.307418 |
| 0.45049 | 0.938447 | 1 | 1 | 1 | 1 | 1 | 1 | 1 | 0.938447 | 0.45049 |
| 0.5 | 1 | 1 | 1 | 1 | 1 | 1 | 1 | 1 | 1 | 0.5 |
| 0.45049 | 0.938447 | 1 | 1 | 1 | 1 | 1 | 1 | 1 | 0.938447 | 0.45049 |
| 0.307418 | 0.763932 | 1 | 1 | 1 | 1 | 1 | 1 | 1 | 0.763932 | 0.307418 |
| 0.084524 | 0.5 | 0.87868 | 1 | 1 | 1 | 1 | 1 | 0.87868 | 0.5 | 0.084524 |
| 0 | 0.171573 | 0.5 | 0.763932 | 0.938447 | 1 | 0.938447 | 0.763932 | 0.5 | 0.171573 | 0 |
| 0 | 0 | 0.084524 | 0.307418 | 0.45049 | 0.5 | 0.45049 | 0.307418 | 0.084524 | 0 | 0 |

Also, FIGS. 26 and 27 illustrate example embodiments of weighted circle masks. In FIGS. 26 and 27, the z axis shows the weight values, and the x-y plane shows the locations of the pixels.

Circular weighted masks may also be used with embodiments that perform histogram-based alignments of images or parts of images (e.g., subfields). In general, a feature histogram includes the intensity histogram of the pixels for an area (e.g., a subfield) of an image. The alignment may be performed by translating the input subfield in all directions, up to N (e.g., 3) pixels in each direction. The translated position that results in the smallest sum of feature differences between an input-image subfield and a reference-image subfield may be selected as the best aligned position. However, if the input-image and reference-image subfields have different rotations, then the different rotations can cause larger feature differences.

To account for different rotations, some embodiments of the image-alignment device modify a pixel's contribution to the histogram bin that corresponds to the pixel's intensity based on the mask weight at the pixel's location. For example, a pixel of intensity 1000 with a corresponding mask weight of 0.5 would contribute 0.5 count (the mask weight at the pixel's location) to the histogram bin that corresponds to the intensity of 1000. And some embodiments of the image-alignment device modify a pixel's intensity according to the mask weight at the pixel's location and then generate a histogram by counting the pixel's contribution to the histogram bin that corresponds to the modified intensity. As an example, a pixel of intensity 1000 with a corresponding mask weight of 0.5 would create a modified intensity of 500 (1000 times 0.5), and the modified pixel would contribute one count in the histogram to the bin that corresponds to the intensity of 500.

Histogram gradients may allow the image-alignment device to perform operations, such as subfield-to-subfield alignment, that use a histogram distance, but in some situations, when creating a histogram using the circular mask, the continuous nature of the circular mask makes it difficult to take histogram gradients with respect to the mask center.

For example, consider a dissimilarity measure $d(h_{ref}, h_2(x_c, y_c))$ that measures the histogram dissimilarity from a histogram $h_{ref}$ of a reference-image subfield to an input image's subfield histogram $h_2(x_c, y_c)$ centered at location $x_c$, $y_c$. As noted above, $x_c$, $y_c$ can be a fractional pixel location. Also for example, the dissimilarity measure (which measures the histogram dissimilarity) may be an earth mover's distance or a shift-invariant earth mover's distance.

In some embodiments, the histogram is formed using the masking function, and the masking function may take one of the forms that are described herein. Some embodiments use mask-generated histograms to align the two image subfields by minimizing $d(h_{ref}, h_2(x_c, y_c))$ over $x_c$ and $y_c$. Because the histograms generated using a mask generally vary smoothly with sub-pixel shifts, it is possible to minimize the distance using techniques such as gradient descent over $x_c$ and $y_c$ in some range of possible $x_c$ and $y_c$ values. The function can also be minimized by considering a grid of values for $x_c$ and $y_c$. Additionally, a coordinated-descent-type technique may be used that in one step seeks to minimize over $x_c$ while keeping $y_c$ fixed and then in a second step fixes $x_c$ and minimizes over $y_c$. This change of parameters to minimize over can be repeated until convergence is achieved or for a specified number of iterations.

Some embodiments where the dissimilarity measure is amenable to analysis (such as cosine similarity, for example) attempt to take the gradient of $d(h_{ref}, h_2(x_c, y_c))$ directly and find a solution. In some embodiments, the gradient needs to be approximated or determined through the applications of small perturbations in $x_c$ and $y_c$ to numerically determine the partial derivatives around some values of $x_c$ and $y_c$.

Figure 28:
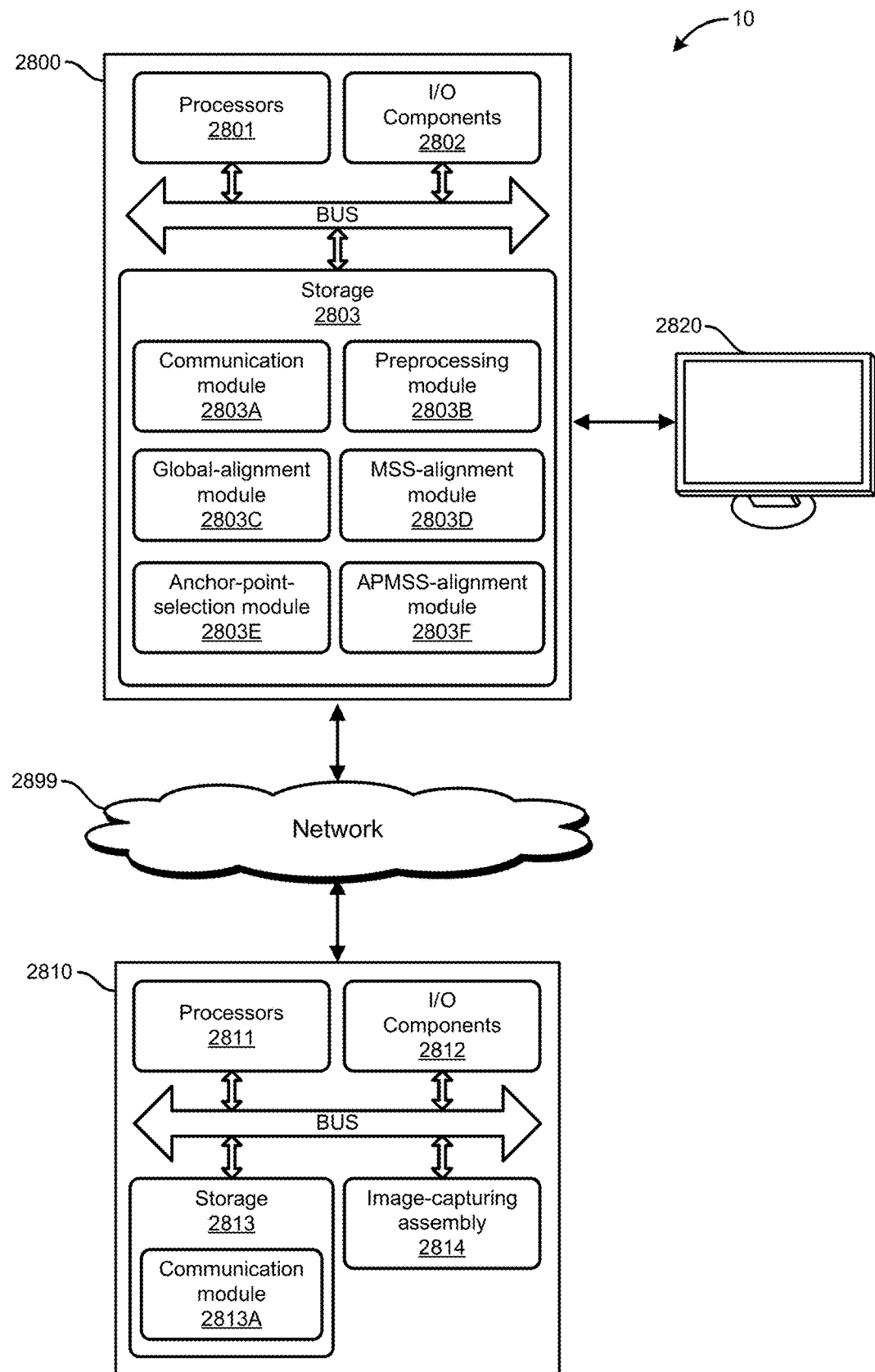
FIG. 28 illustrates an example embodiment of an image-alignment system.

FIG. 28 illustrates an example embodiment of an image-alignment system. The system 10 includes an image-alignment device 2800, which is a specially-configured computing device; an image-capturing device 2810; and a display device 2820. In this embodiment, the image-alignment device 2800 and the image-capturing device 2810 communicate via one or more networks 2899, which may include a wired network, a wireless network, a LAN, a WAN, a MAN, and a PAN. Also, in some embodiments the devices communicate via other wired or wireless channels.

The image-alignment device 2800 includes one or more processors 2801, one or more I/O components 2802, and storage 2803. Also, the hardware components of the image-alignment device 2800 communicate via one or more buses or other electrical connections. Examples of buses include a universal serial bus (USB), an IEEE 1394 bus, a PCI bus, an Accelerated Graphics Port (AGP) bus, a Serial AT Attachment (SATA) bus, and a Small Computer System Interface (SCSI) bus.

The one or more processors 2801 include one or more central processing units (CPUs), which may include microprocessors (e.g., a single core microprocessor, a multi-core microprocessor); one or more graphics processing units (GPUs); one or more tensor processing units (TPUs); one or more application-specific integrated circuits (ASICs); one or more field-programmable-gate arrays (FPGAs); one or more digital signal processors (DSPs); or other electronic circuitry (e.g., other integrated circuits). The I/O components 2802 include communication components (e.g., a GPU, a network-interface controller) that communicate with the display device 2820, the network 2899, the image-capturing device 2810, and other input or output devices (not illustrated), which may include a keyboard, a mouse, a printing device, a touch screen, a light pen, an optical-storage device, a scanner, a microphone, a drive, and a controller (e.g., a joystick, a control pad).

The storage 2803 includes one or more computer-readable storage media. As used herein, a computer-readable storage medium, in contrast to a mere transitory, propagating signal per se, refers to a computer-readable media that includes an article of manufacture, for example a magnetic disk (e.g., a floppy disk, a hard disk), an optical disc (e.g., a CD, a DVD, a Blu-ray), a magneto-optical disk, magnetic tape, and semiconductor memory (e.g., a non-volatile memory card, flash memory, a solid-state drive, SRAM, DRAM, EPROM, EEPROM). Also, as used herein, a transitory computer-readable medium refers to a mere transitory, propagating signal per se, and a non-transitory computer-readable medium refers to any computer-readable medium that is not merely a transitory, propagating signal per se. The storage 2803, which may include both ROM and RAM, can store computer-readable data or computer-executable instructions.

The image-alignment device 2800 also includes a communication module 2803A, a preprocessing module 2803B, a global-alignment module 2803C, an MSS-alignment module 2803D, an anchor-point-selection module 2803E, and an APMSS-alignment module 2803F. A module includes logic, computer-readable data, or computer-executable instructions. In the embodiment shown in FIG. 28, the modules are implemented in software (e.g., Assembly, C, C++, C#, Java, BASIC, Perl, Visual Basic). However, in some embodiments, the modules are implemented in hardware (e.g., customized circuitry) or, alternatively, a combination of software and hardware. When the modules are implemented, at least in part, in software, then the software can be stored in the storage 2803. Also, in some embodiments, the image-alignment device 2800 includes additional or fewer modules, the modules are combined into fewer modules, or the modules are divided into more modules.

The communication module 2803A includes instructions that cause the image-alignment device 2800 to communicate with one or more other devices (e.g., the image-capturing device 2810, the display device 2820), for example to obtain one or more images as described in blocks B305 and B330 in FIG. 3 or in blocks B1705 and B1730 in FIG. 17.

The preprocessing module 2803B includes instructions that cause the image-alignment device 2800 to perform preprocessing on one or more images, for example as described in blocks B310 and B335 in FIG. 3 or in blocks B1710 and B1735 in FIG. 17.

The global-alignment module 2803C includes instructions that cause the image-alignment device 2800 to globally-align two images (e.g., by aligning an image to a reference image) and shift an image based on the results of the global alignment, for example as described in block B340 in FIG. 3 or in block B1740 in FIG. 17.

The MSS-alignment module 2803D includes instructions that cause the image-alignment device 2800 to split an image into subfields, align each subfield with a corresponding subfield in a reference image, and warp each subfield based on the alignment results, for example as described in blocks B345-B350 in FIG. 3 or in blocks B1745 to B1750 in FIG. 17.

The anchor-point-selection module 2803E includes instructions that cause the image-alignment device 2800 to select anchor points in an image, select anchor-edge points in an image, and select neighborhood areas in an image, for example as described in blocks B315-B325 in FIG. 3, in block B1715 in FIG. 17, or in blocks B2100-B2185 in FIG. 21.

The APMSS-alignment module 2813F includes instructions that cause the image-alignment device 2800 to perform APMSS alignment to align an image with a reference image and to warp the image based on the results of the APMSS alignment, for example as described in block B355 in FIG. 3 or in block B1755 in FIG. 17.

The image-capturing device 2810 includes one or more processors 2811, one or more I/O components 2812, storage 2813, a communication module 2813A, and an image-capturing assembly 2814. The image-capturing assembly 2814 includes one or more image sensors and may include one or more lenses and an aperture. The communication module 2813A includes instructions that, when executed, or circuits that, when activated, cause the image-capturing device 2810 to capture an image, receive a request for an image from a requesting device, retrieve a requested image from the storage 2813, or send a retrieved image to the requesting device (e.g., the image-alignment device 2800).

At least some of the above-described devices, systems, and methods can be implemented, at least in part, by providing one or more computer-readable media that contain computer-executable instructions for realizing the above-described operations to one or more computing devices that are configured to read and execute the computer-executable instructions. The systems or devices perform the operations of the above-described embodiments when executing the computer-executable instructions. Also, an operating system on the one or more systems or devices may implement at least some of the operations of the above-described embodiments.

Furthermore, some embodiments use one or more functional units to implement the above-described devices, systems, and methods. The functional units may be implemented in only hardware (e.g., customized circuitry) or in a combination of software and hardware (e.g., a microprocessor that executes software).

The scope of the claims is not limited to the above-described embodiments and includes various modifications and equivalent arrangements. Also, as used herein, the conjunction "or" generally refers to an inclusive "or," though "or" may refer to an exclusive "or" if expressly indicated or if the context indicates that the "or" must be an exclusive "or."

The invention claimed is:

1. A device comprising:
one or more computer-readable storage media; and
one or more processors in communication with the one or more computer-readable media to cause the device to perform operations comprising:
obtaining a first image;
obtaining a second image;
selecting corresponding subfields in the first image and in the second image, wherein each subfield in the second image corresponds to a respective subfield in the first image;
aligning the subfields in the second image to their respective corresponding subfields in the first image, thereby generating first respective pixel shifts for at least some pixels in the second image;
shifting the at least some pixels in the second image based on their first respective pixel shifts, thereby generating a third image;
selecting anchor points in the first image, wherein each of the anchor points is associated with a respective area in the first image, and wherein each of the respective areas in the first image has a corresponding area in the second image;
aligning the areas in the third image to their corresponding areas in the first image based on the anchor points, thereby generating second respective pixel shifts for at least some pixels in the third image; and
shifting the at least some pixels in the third image according to the second respective pixels shifts, thereby generating a fourth image.

2. The device of claim 1, wherein the operations further comprise:
identifying a defect in an object in the fourth image.

3. The device of claim 1, wherein each of the anchor points in the first image is selected based on two or more intersecting lines.

4. The device of claim 1, wherein selecting the anchor points in the first image includes generating an alignability map based on a largest eigenvalue of the Hessian of a respective autocorrelation matrix for a respective neighborhood area around each point in the first image.

5. The device of claim 1, wherein the operations further comprise globally aligning the second image to the first image.

6. A method comprising:
obtaining a first image;
obtaining a second image;
selecting corresponding subfields in the first image and in the second image, wherein each subfield in the second image corresponds to a respective subfield in the first image;
aligning the subfields in the second image to their respective corresponding subfields in the first image, thereby generating first respective pixel shifts for at least some pixels in the second image;
shifting the at least some pixels in the second image based on their first respective pixel shifts, thereby generating a third image;
selecting anchor points in the first image, wherein each or me anchor points is associated with a respective area in the first image, and wherein each of the respective areas in the first image has a corresponding area in the second image;

aligning the areas in the third image to their corresponding areas in the first image based on the anchor points, thereby generating second respective pixel shifts for at least some pixels in the third image; and shifting the at least some pixels in the third image according to the second respective pixels shifts, thereby generating a fourth image.

7. The method of claim 6, further comprising:
identifying a defect in an object in the fourth image.

8. The method of claim 6, wherein each of the anchor points in the first image is selected based on two or more intersecting lines.

9. The method of claim 6, wherein selecting the anchor points in the first image includes generating an alignability map based on a largest eigenvalue of the Hessian of a respective autocorrelation matrix for a respective neighborhood area around each point in the first image.

10. The method of claim 6, further comprising:
globally aligning the second image to the first image.

11. One or more non-transitory computer-readable media storing computer-executable instructions that, when executed by one or more computing devices, cause the one or more computing devices to perform operations comprising:
obtaining a first image;
obtaining a second image;
selecting corresponding subfields in the first image and in the second image, wherein each subfield in the second image corresponds to a respective subfield in the first image;
aligning the subfields in the second image to their respective corresponding subfields in the first image, thereby generating first respective pixel shifts for at least some pixels in the second image;

shifting the at least some pixels in the second image based on their first respective pixel shifts, thereby generating a third image;

selecting anchor points in the first image, wherein each of the anchor points is associated with a respective area in the first image, and wherein each of the respective areas in the first image has a corresponding area in the second image;

aligning the areas in the third image to their corresponding areas in the first image based on the anchor points, thereby generating second respective pixel shifts for at least some pixels in the third image; and shifting the at least some pixels in the third image according to the second respective pixels shifts, thereby generating a fourth image.

12. The one or more non-transitory computer-readable media of claim 11, wherein the operations further comprise:
identifying a defect in an object in the fourth image.

13. The one or more non-transitory computer-readable media of claim 11, wherein each of the anchor points in the first image is selected based on two or more intersecting lines.

14. The one or more non-transitory computer-readable media of claim 11, wherein selecting the anchor points in the first image includes generating an alignability map based on a largest eigenvalue of the Hessian of a respective autocorrelation matrix for a respective neighborhood area around each point in the first image.

15. The one or more non-transitory computer-readable media of claim 11, wherein the operations further comprise globally aligning the second image to the first image.

\* \* \* \* \*